(12) United States Patent
Lumsden et al.

(10) Patent No.: US 7,627,125 B2
(45) Date of Patent: Dec. 1, 2009

(54) KEY LOADING SYSTEMS AND METHODS

(75) Inventors: Ian A. Lumsden, West Bend, WI (US);
John R. Brittain, Wauwatosa, WI (US);
Scott R. Statland, Mequon, WI (US);
Sandra A. Palmer, Shorewood, WI (US)

(73) Assignee: eFunds Corporation, Scottsdale, AZ (US)

( * ) Notice: Subject to any disclaimer, the term of this patent is extended or adjusted under 35 U.S.C. 154(b) by 804 days.

(21) Appl. No.: 11/165,429

(22) Filed: Jun. 23, 2005

(65) Prior Publication Data
US 2006/0294378 A1    Dec. 28, 2006

(51) Int. Cl.
*H04L 9/14* (2006.01)
(52) U.S. Cl. .......................... 380/277; 705/71
(58) Field of Classification Search ................. 380/277; 705/71
See application file for complete search history.

(56) References Cited

U.S. PATENT DOCUMENTS

| | | | |
|---|---|---|---|
| 4,268,715 A | 5/1981 | Atalla | |
| 4,283,599 A | 8/1981 | Atalla | |
| 4,317,957 A | 3/1982 | Sendrow | |
| 4,386,234 A | 5/1983 | Ehrsam et al. | |
| 4,423,287 A | 12/1983 | Zeidler | |
| 4,498,000 A | 2/1985 | Decavele et al. | |
| 4,578,530 A | 3/1986 | Zeidler | |
| 4,578,531 A | 3/1986 | Everhart et al. | |
| 4,605,820 A | 8/1986 | Campbell, Jr. | |
| 4,912,762 A | 3/1990 | Lee et al. | |
| 4,933,971 A | 6/1990 | Bestock et al. | |
| 4,972,472 A | 11/1990 | Brown et al. | |
| 5,689,565 A | 11/1997 | Spies et al. | |
| 5,761,306 A * | 6/1998 | Lewis | 380/282 |
| 6,125,185 A | 9/2000 | Boesch | |
| 6,260,050 B1 * | 7/2001 | Yost et al. | 715/202 |
| 6,606,387 B1 | 8/2003 | Abraham | |
| 6,611,194 B1 * | 8/2003 | Vieweg et al. | 340/5.2 |
| 6,654,883 B1 | 11/2003 | Tatebayashi | |
| 6,684,334 B1 | 1/2004 | Abraham | |
| 2002/0023215 A1 | 2/2002 | Wang et al. | |
| 2002/0064283 A1 | 5/2002 | Parenty | |
| 2002/0141590 A1 | 10/2002 | Montgomery | |
| 2002/0146132 A1 | 10/2002 | Medvinsky | |

(Continued)

FOREIGN PATENT DOCUMENTS

WO    WO 00/25466    5/2000

OTHER PUBLICATIONS

Trusted Security Solutions, Inc.; ATM Solutions: remote re-key; TSS ATM Solutions—A98 Triple Des; pp. 1-2; http://www.trustedsecurity.com/remoterekey.htm.

(Continued)

*Primary Examiner*—Gilberto Barron, Jr.
*Assistant Examiner*—Devin Almeida
(74) *Attorney, Agent, or Firm*—Michael Best & Friedrich LLP

(57) ABSTRACT

Systems and methods for loading a key to a terminal. The system can include a terminal manager system including a terminal handler that receives terminal information from a terminal, generates an authentication request including at least a portion of the terminal information, and generates a key request. The system can also include a server that sends the authentication request to a key manager system and sends the key request to the key manager system.

54 Claims, 16 Drawing Sheets

U.S. PATENT DOCUMENTS

2003/0081774 A1     5/2003    Lin et al.
2003/0115466 A1     6/2003    Aull et al.

OTHER PUBLICATIONS

Trused Security Solutions, Inc.; A98 for Remote Re-Key; Nov. 2003; pp. 1-2; http://www.trustedsecurity.com/Docs/A98SysD_GenReKey_F_123_p1&2WEB.pdf.

Ann All; Increased automation may be key to PIN security; 2004; pp. 1-7; ATMmarkeingplace.com; http://www.atmmarketplace.com/special publications/automation.pdf.

Schneier, Bruce; "Applied Cryptography;" 1996; pp. 0, V, VII-XIV, 37-39, and 185-187; John Wiley & Sons, Inc.; U.S.

* cited by examiner

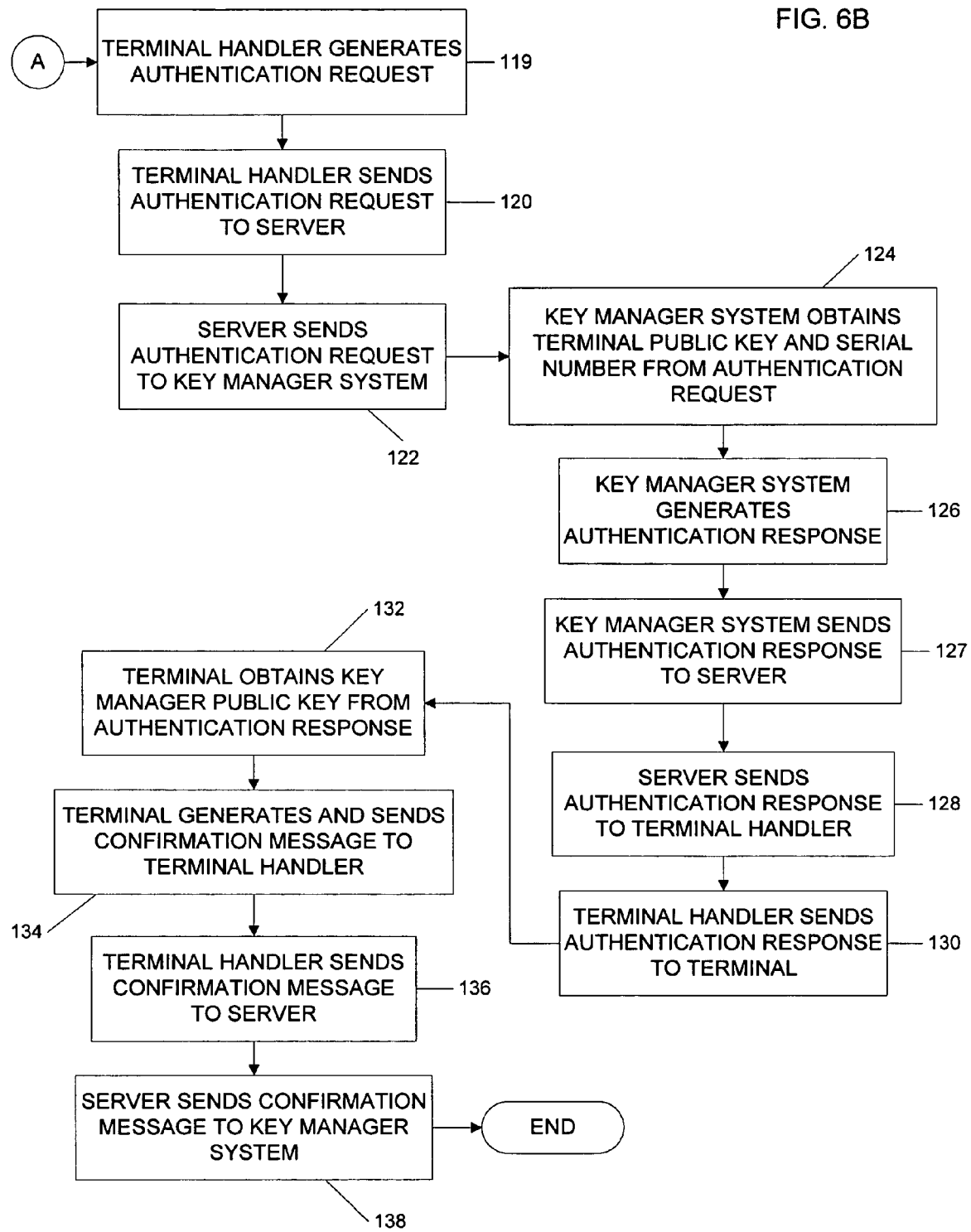

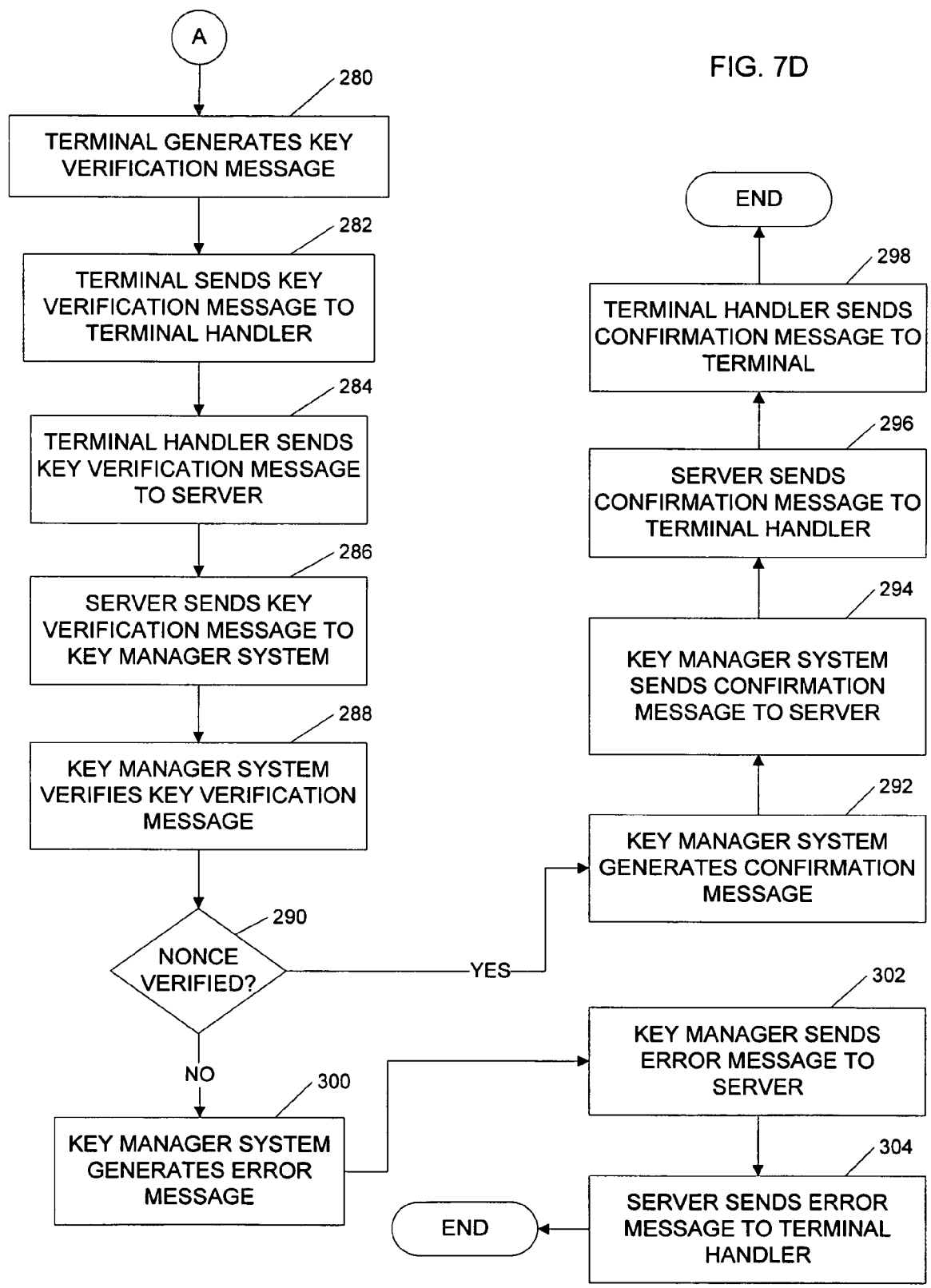

KEY LOADING SYSTEMS AND METHODS

FIELD OF THE INVENTION

The invention generally relates to managing a financial transaction system. In particular, embodiments of the invention relate to loading a key to a financial transaction terminal included in a financial transaction system from a key manager system.

BACKGROUND OF THE INVENTION

Given the high security of financial transaction systems, financial transaction terminals, such as automated teller machines ("ATMs") and point-of-sale ("POS") devices, often use cryptographic techniques in order to protect sensitive transaction data transmitted through a financial transaction system. Traditionally, each financial transaction terminal in a financial transaction system is assigned a key. The financial transaction terminals use the keys to encrypt transaction data before transmitting the transaction data to another device. Because the transaction data is encrypted, eavesdroppers intercepting the transmission cannot obtain the actual transaction data, and therefore, cannot use the data illegally.

In the past, keys were manually distributed to financial transaction terminals using a security concept referred to as "dual control." The security concept of dual control involves having multiple people (e.g., two people) physically visit a site of a financial transaction terminal (e.g., an ATM) and load separate components of a key into the financial transaction terminal. Although multiple people are involved in issuing the key, a single person does not know the entire key, and therefore, the security and secrecy of the key is increased.

In recent years, the American National Standards Institute ("ANSI") suggested that financial transaction terminals each be issued a unique key in order to increase the security of financial transaction systems. By assigning each financial transaction terminal a unique key, one comprised key can only be used to exploit a single financial transaction terminal and does not provide access to every financial transaction terminal included in a financial transaction system. In addition, ANSI suggested that each financial transaction terminal use a longer (i.e., harder to break by brute force) key, such as a triple data encryption standard ("DES") key that includes 112 bits.

In order to adhere to suggestions of ANSI, new keys need to be loaded to financial transaction terminals. However, re-keying multiple financial transaction terminals of a financial transaction system using a manual key distribution process can be costly and time consuming. In addition, using a human-intensive process can be prone to errors and can decrease the security of the distributed keys. For example, if the multiple individuals involved in a key distribution process pool their individual knowledge of a key, an entire key can be obtained illegally.

SUMMARY OF THE INVENTION

Some embodiments of the invention provide a terminal manager system. The terminal manager system can include a terminal handler that receives terminal information from a terminal, generates an authentication request including at least a portion of the terminal information, and generates a key request. The terminal manager system also includes a server that sends the authentication request to a key manager system and sends the key request to the key manager system.

Additional embodiments of the invention provide a method of loading a key to a terminal including sending terminal information from the terminal to a terminal handler and generating an authentication request with the terminal handler. The authentication request can include at least a portion of the terminal information. The method can also include sending the authentication request to a server and a key manager system, generating an authentication response with the key manager system, sending the authentication response to the terminal handler and the terminal, generating a key request with the terminal handler, sending the key request to the server and the key manager system, and generating a key response with the key manager system. The key response can include a key. Finally, the method can include sending the key response to the terminal handler and the terminal.

Another embodiment of the invention provides a method of exchanging cryptographic information used for loading keys from a key manager system to a plurality of terminals included in a financial transaction system. The method can include encrypting, with a key manager system, a key manager public key encrypted with a key manager private key; sending the key manager public key encrypted with the key manager private key to an authority system; sending an authority public key encrypted with an authority private key to the terminal manager system; and verifying the authority signature.

BRIEF DESCRIPTION OF THE DRAWINGS

FIGS. 6A-6B illustrate a process of authenticating a terminal with the key manager system of the financial transaction system of FIG. 1 according to one embodiment of the invention.

FIG. 7C-7D illustrate a process of loading a key to a terminal from the key manager system of the financial transaction system of FIG. 1 according to one embodiment of the invention.

DETAILED DESCRIPTION

Figure 1:
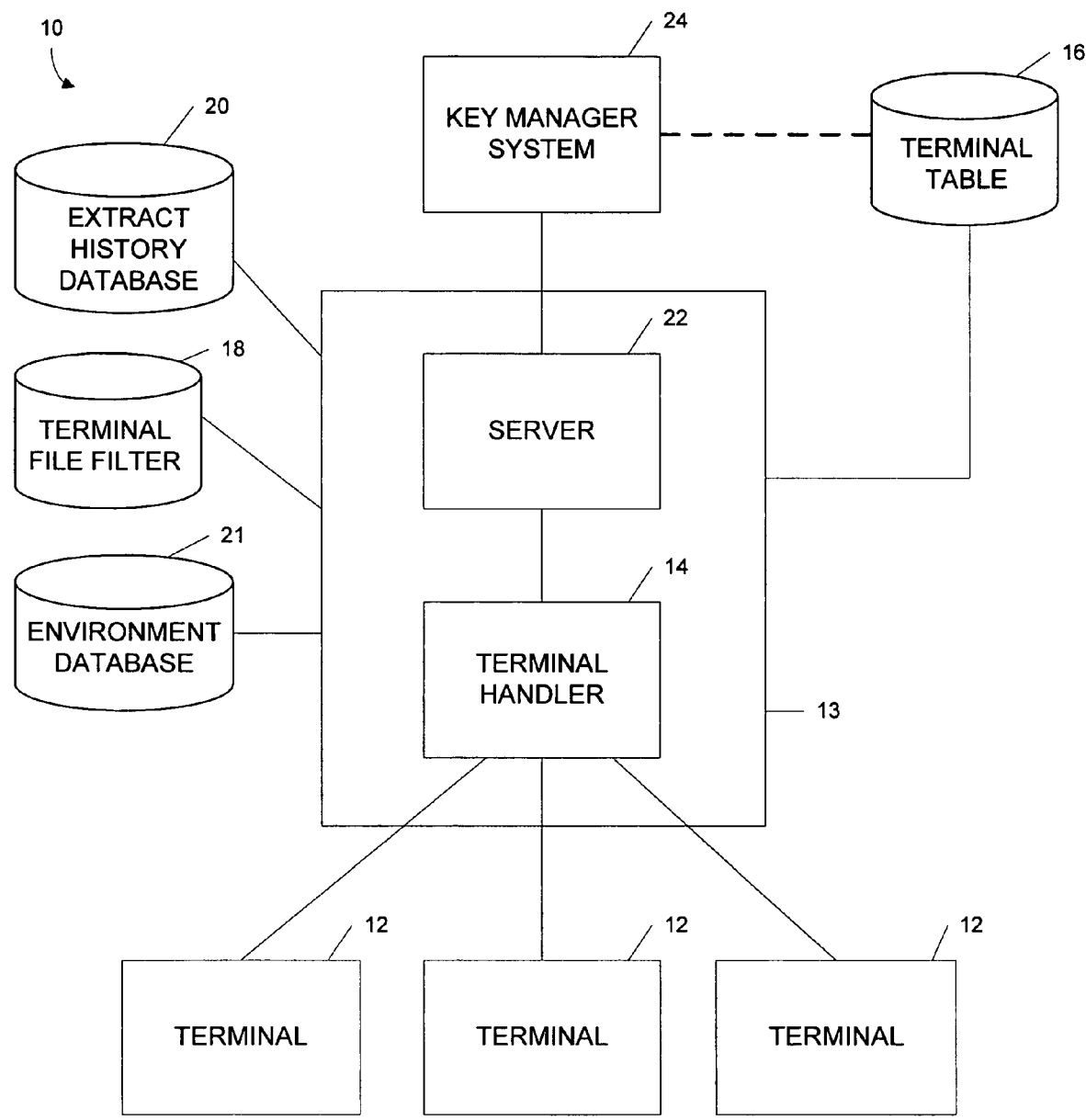
FIG. 1 illustrates a financial transaction system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and software components or modules. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

FIG. 1 illustrates a financial transaction system 10 according to one embodiment of the invention. As shown in FIG. 1, the system 10 can include one or more financial transaction terminals (hereinafter "terminals") 12, a host system or terminal manager system 13, a terminal handler 14, a terminal table 16, a terminal file filter 18, an extract history database 20, an environment database 21, a server 22, and a key manager system 24. The system 10 can include more or fewer components than those shown in FIG. 1. In addition, the functionality of the components of the system 10 can be combined and distributed in configurations other than as shown in FIG. 1. For example, the system 10 can include fewer or additional terminals 12. The system 10 may not include a separate terminal handler 14. In some embodiments, the functionality of the terminal handler 14 can be combined with the functionality of the terminals 12 and/or the server 22 in a single component of the system 10. The system 10 can also include more than one terminal hander 14. For example, each terminal 12 can be associated with a separate terminal handler. The functionality of the key manager system 24 can be combined with the functionality of the server 22 and represented as a single component of the system 10. In some embodiments, the functionality of the key manager system 24 and the terminal manager system 13 can be combined and distributed in other configurations than those illustrated and described.

In some embodiments, the terminals 12 can be included in a network of terminals. The terminals 12 can also be included in multiple networks of terminals managed by the terminal manager system 13.

A terminal 12 can include an automated teller machine ("ATM"), a point-of-sale ("POS") device, or another financial transaction terminal, such as a workstation that provides an interface to the system 10. In some embodiments, a terminal 12 can include an ATM similar to those provided by NCR™ Corporation and Diebold™ Incorporated. Additional types or brands of ATMs can be included in the system 10.

Figure 2:
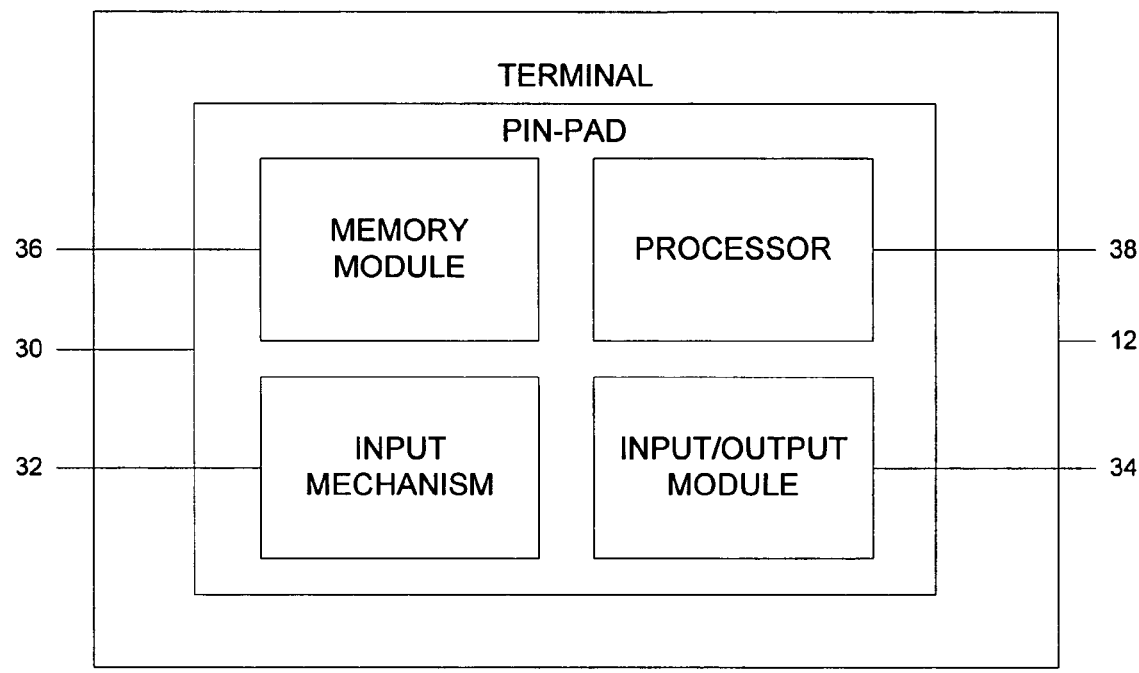
FIG. 2 illustrates a terminal included in the financial transaction system of FIG. 1.

FIG. 2 illustrates a terminal 12 according to one embodiment of the invention. As shown in FIG. 2, a terminal 12 can include a pin-pad 30. The pin-pad 30 can include an input mechanism 32, such as a keypad, a touchscreen, a card reader, etc., that allows a user to enter personal data, such as a personal identification number ("PIN"). As shown in FIG. 2, the pin-pad 30 can also include an I/O module 34 that transmits entered data to other components of the terminal 12 and/or other components included in the system 10. In some embodiments, the pin-pad 30 can include a memory module 36 and a processor 38. The memory module 36 can store a key issued to a terminal 12. The memory module 36 can also store software executable with the processor 38. In some embodiments, the processor 38 executes software stored in the memory module 36 in order to encrypt data entered with the input mechanism 32 with a key stored in the memory module 36 before the data is transmitted by the I/O module 34. The software can encrypt the entered data using various encryption techniques, such as Rivest, Shamir, and Adleman ("RSA") encryption, data encryption standard ("DES") encryption, and triple data encryption standard ("3DES") encryption.

In some embodiments, the pin-pad 30 provides tamper resistance, and any attempt to illegally obtain access to the pin-pad 30 can destroy the key stored in the memory module 36 of the pin-pad 30. Once a key associated with a terminal 12 is destroyed, all subsequent transactions involving the terminal 12 can fail. The failure of transactions can alert a technician or terminal manager to reissue a key and reinstall or reset a pin-pad 30 of a terminal 12.

The terminal table 16 can include information associated with one or more terminals 12 that the key manager system 24 can interact with. In some embodiments, the terminal table 16 can include one or more database tables, such as a standard query language ("SQL") tables resident on a server, such as a Hewlett-Packard® NonStop (Tandem) server. The database tables can be published via open database connectivity ("ODBC"). In some embodiments, the terminal table 16 can be included and/or managed with the terminal manager system 13.

In order to create the terminal table 16, the terminal manager system 13 can execute an extraction program. In some embodiments, the extraction program can include a command-based ("CBASE") program. The extraction program can extract terminal information from one or more data sources, such as the environment database 21. The environment database 21 can include configuration data for the terminal manager system 13. For example, the environment database 21 can include configuration data that defines what programs or applications the terminal manager system 13 should execute, how fast to run or execute particular programs, and which programs are associated with other programs executed with the terminal manager system 13. The environment database 21 can include mapping definitions for the terminal manager system 13, such as where the environment database 21 is located. In addition, the environment database 21 can include a terminal file. The terminal file can provide information about the terminals 12 managed with the terminal manager system 13, such as a financial institution associated with a terminal, functionality provided by a terminal 12, etc. The environment databases 21 can also include a physical description file that provides information about the terminals 12, such as a communication protocol used with a terminal 12. The environment database 21 can include a key file that includes keys used to communicate with the terminals 12 and/or other components of the terminal manager system 13 or external systems. In some embodiments, the keys included in the key file can be encrypted for further security.

In some embodiments, changes to the environment databases 21 can be managed through a change management system. The change management system can record changes that are audited and activated. In particular, the change management system can manage a change file or database that tracks which files or databases that have been affected by a particular change.

The extraction program can obtain terminal information from the terminal file filter 18. The terminal file filter 18 can include a number of records that define values used to populate one or more fields of the terminal table 16. In some embodiments, the terminal file filter 18 can include records defining values of a remotehandler_name field of the terminal table 16. The remotehandler_name field can specify a public key and a private key (or a pointer to a public and a private key) assigned to a terminal 12 (or a corresponding terminal driver). In some embodiments, terminals 12 managed with the terminal manager system 13 can be assigned a public key and a private key. In other embodiments, if the terminal manager system 13 manages one or more networks of terminals, terminals included in each network can be assigned a different public key and a different private key. Terminals 12 included in one or more networks can also be associated with a particular client, such as ATMs associated with a particular financial institution, and can be assigned a public key and a private key pair different from other terminals 12 managed with the terminal manager system 13. In some embodiments, the terminal manager system 13 can encrypt messages sent to a terminal 12 with a public key assigned to the terminal 12. The terminal 12 can use the corresponding assigned private key to decrypt the messages.

In some embodiments, the terminal file filter 18 can include three types of records. A first record type can indicate a system-wide public key and private key. A second record type can indicate a public key and a private key associated with a particular network identifier associated with a terminal 12. A third record type can indicate an override public key and an override private key associated with a client identifier of a terminal 12 (i.e., a particular financial institution managing a terminal). In some embodiments, network identifiers and client identifiers associated with a particular terminal 12 can be stored in the environment database 21. Each type of record can include a field specifying a protocol that a public key and a private key are to be used with. For example, each type of record can specify one of two protocols. A first protocol can include a signature-based protocol, and a second protocol can include a certificate-based protocol.

Table 1 provides fields of the terminal file filter 18 according to one embodiment of the invention.

TABLE 1

| Record Type | Protocol | Network | Client | Protocol |
|---|---|---|---|---|
| 0 | "SBP" | — | — | Signature-based |
| 0 | "CBP" | — | — | Certificate-based |
| 1 | "SBP" | NET1 | — | Signature-based |
| 1 | "CBP" | NET1 | — | Certificate-based |
| 2 | "SBP" | NET2 | CSH1 | Signature-based |
| 2 | "CBP" | NET2 | CSH1 | Certificate-based |

In some embodiments, records included in the terminal file filter 18 can include fields of alphanumeric data separated by non-alphanumeric characters, such as one or more spaces, commas, semicolons, white spaces, etc. In some embodiments, a record that contains an exclamation point "!" in the first column is treated as a comment and skipped. In addition, all information stored in the terminal file filter 18 can be wrapped to upper case before the extraction program processes the records.

In addition, if the terminal file filter 18 includes duplicate records, such as multiple system-wide public keys and private keys for a signature-based protocol, the extraction program can use a last sequential record in the terminal file filter 18 to populate the terminal table 16.

In some embodiments, the terminal table 16 includes one or more fields. Some fields can be required and some fields can be optional. Table 2 provides fields included in the terminal table 16 according to one embodiment of the invention.

TABLE 2

| Field | Required | Data Type | Description |
|---|---|---|---|
| Id | Yes | Integer | Terminal Type ID. See TABLE 3 below for mapping values. |
| id_alias | Yes | Text | Device identifier |
| addr1 | No | Text | Card accepting address |
| City | No | Text | Card accepting city |
| State | No | Text | Card accepting state |
| postal_code | No | Text | Card accepting postal code |
| Country | No | Text | Card accepting country |
| phone_use_cid | Yes | Boolean | False |
| Active | Yes | Boolean | True |
| Notes | No | Text | User notes |
| Hst_name | Yes | Text | System name |
| ivr_code_numeric | Yes | Text | Telephone keypad interpretation. For example, 2 = "ABC," 3 = "DEF," etc. |
| Kem_id | Yes | Integer | Key type of terminal. |
| remotehandler_name | Yes | Text | Public key and private key (or a pointer to a public and a private key) assigned to a terminal |
| remote_protocol | Yes | Text | Protocol |

As shown in Table 2, the terminal table 16 can include an identifier or "Id" field. The identifier field can specify a terminal type identifier that describes a make or model of a particular terminal 12. Each terminal type can be associated with one or more terminal makes or models. Table 3 illustrates terminal types and associated terminal makes or models according to one embodiment of the invention.

TABLE 3

| Terminal Type Identifier | EMULATION-MODEL or VENDOR-MODEL Literal Value |
|---|---|
| 4 | vm-dbld-906 |
| 5 | vm-dbld-910 |
| 6 | vm-dbld-911 |
| 7 | vm-dbld-912 |
| 10 | vm-dbld-1060, vm-dbld-1061, vm-dbld-1062, vm-dbld-1063, vm-dbld-1064 |
| 12 | vm-dbld-1071, vm-dbld-1072, vm-dbld-1073, vm-dbld-1074 |
| 28 | vm-ncr-1770 |
| 29 | vm-ncr-1780 |
| 30 | vm-ncr-5070, vm-ncr-5080, vm-ncr-5081, vm-ncr-5084, vm-ncr-5085, vm-ncr-5088 |
| 32 | vm-ncr-5663, vm-ncr-5665, vm-ncr-5670, vm-ncr-5674, vm-ncr-5675, vm-ncr-5682, vm-ncr-5684, vm-ncr-5685, vm-ncr-5688 |

TABLE 3-continued

| Terminal Type Identifier | EMULATION-MODEL or VENDOR-MODEL Literal Value |
|---|---|
| 34 | vm-ncr-5840, vm-ncr-5870, vm-ncr-5870m, vm-ncr-5874, vm-ncr-5875, vm-ncr-5877, vm-ncr-5884, vm-ncr-5885, vm-ncr-5888, vm-ncr-5890 |
| 37 | vm-tidel-mpd, vm-tidel-sc, vm-tidel-td, vm-tidel-tdm, vm-tidel-tds, vm-tidel-IS1000, vm-tidel-IS2000 |
| 38 | vm-triton-5000, vm-triton-9100, vm-triton-9100, vm-triton-9501, vm-triton-9515, vm-triton-9520, vm-triton-9600, vm-triton-9601, vm-triton-9610, vm-triton-9615, vm-triton-9620, vm-triton-9621, vm-triton-9635, vm-triton-9640, vm-triton-9641, vm-triton-9650, vm-triton-9660, vm-triton-9661, vm-triton-9700, vm-triton-9705, vm-triton-9710, vm-triton-9800, vm-triton-9810, vm-triton-9840, vm-triton-9841, vm-triton-9850, vm-triton-9860, vm-triton-9861, vm-triton-9870, vm-triton-mako |

In some embodiments, a user can specify configuration details and/or a location of a configuration file during execution of the extraction program. The configuration details (specified by a user or in a configuration file) can specify where and/or how to extract terminal information from one or more data sources. The location of the configuration file and/or the configuration details themselves can also be preprogrammed into the extraction program.

In some embodiments, the configuration details can specify one or more data sources to extract data from, such as the environment database 21 and the terminal file filter 18. The configuration details can include the location of data sources, the names and/or formats of data stored in each data source, and/or methods or functions for obtaining the data from the data sources. In addition, the configuration details can specify a location where the terminal table 16 should be stored and/or updated once it is created.

Data extracted from each data source can be used to create and populate the terminal table 16. Data extracted and/or generated during the execution of the extraction program can also be stored to the environment database 21, the extract history database 20, and/or the terminal file filter 18. For example, logging data, such as a timestamp and/or a network identifier, that specifies the completion of executing the extraction program can be stored in the extract history database 20.

In some embodiments, the extraction program can retrieve (e.g., from the configuration file or a separate location) a network or switch identifier, the locations of the source databases, and a build type. In some embodiments, the build type specifies whether test records should be included in the terminal table 16.

The extraction program can create the terminal table 16 in various processing modes. For example, in a first mode, the extraction program can add terminal information from the data sources, such as the environment database 21, to the terminal table 16. The environment database 21 can include productive records and logically-deleted records, and during the first processing mode, both the productive records and the logically-deleted records can be extracted and corresponding information can be added to the terminal table 16. After extracting information from the data sources, the extraction program can also add a network or switch identifier and a last-change-number timestamp to the history database 20 in order to log completion of creating or updating the terminal table 16.

In a second processing mode, the extraction program can read the contents of the extract history database 20 in order to determine a last extraction process completed. The extraction program can then obtain any changes that were made to any data sources, such as the environment database 21 between the time of a last extraction process and the time of the current extraction process. In some embodiments, the extraction program only obtains those changes that affect particular files associated with the terminals 12, such as the terminal file or the key file. In some embodiments, the extraction program can use the change management system and/or the change file to determine data sources that have been changed. For example, the extraction program can use the change file to determine which data sources (i.e., files and/or databases) where affected by particular changes. In some embodiments, the extraction program analyzes changes to the terminal file and/or the key file in order to determine changes used with the terminals 12. If data in the terminal file and/or the key file associated with a particular terminal 12 was modified since the last creation or update of the terminal table 16, the extraction program can reprocess the data (i.e., add or replace the data in the terminal table 16).

After extracting terminal information from the data sources in the second processing mode, the extraction program can add or update a network identifier and a last-change-number timestamp in the extract history database 20.

In some embodiments, a failure to find information in the extract history database 20 for a last extraction process completion, the extraction program can default to the first or complete extraction mode as described above. During normal operation, the extraction program can default to extracting terminal information from the data sources in the second processing mode.

Problems adding information associated with a terminal 12 to the terminal table 16 during the extraction process (e.g., a data mapping error) can cause the extraction program to generate a warning. The warning can be displayed to a user initializing the execution of the extraction program. The warning can also be logged for later review and analysis. In some embodiments, the extraction program can skip over terminals 12 with associated errors and can continue the extraction process. In some embodiments, a user can interrupt the extraction process by providing particular input, such as pressing one or more keys.

To protect the integrity of the information stored in the terminal table 16, the terminal table 16 can be transaction monitoring facility ("TMF") protected and a TMF transaction can be completed every number of operations, such as every 100 operations in one embodiment.

The extract history database 20 can include information regarding when the extraction program was executed. The extract history database 20 can include a network-identifier and a last-change-number timestamp that corresponds to each time the extraction program was executed. In some embodiments, the extract history database 20 can be TMF protected.

In some embodiments, the terminal table 16 can be managed with the terminal manager system 13. The terminal manager system 13 can publish the terminal table 16 via ODBC. The key manager 24 can access the terminal table 16 in order to obtain information regarding the terminals 12 managed by the terminal manager system 13. The terminal table 16 can include terminal information regarding terminals 12 managed by the terminal manager system 13 on multiple networks. Once the extraction program creates and stores the terminal table 16, the key manager system 24 can use the terminal file to interact with the terminal manager system 13 and/or the terminals 12.

The terminals 12 can communicate with the terminal handler 14. In some embodiments, the terminal handler 14 and the terminals 12 communicate using Transmission Control Protocol Internet Protocol ("TCP/IP") over a connection, such as a dial-up connection. The terminal handler 14 can be configured to request information from the terminals 12 needed to interact with the key manager system 24 using key loading dialog messages. In some embodiments, the terminal handler 14 can request different information from different terminals 12, depending on a protocol used by the terminal 12 to receive a key from the key manager system 24. For example, the terminal handler 14 can request different information from a terminal 12 using a signature-based protocol than a terminal 12 using a certificate-based protocol. In some embodiments, the protocol used by a terminal 12 can depend on a make and/or model of the terminal 12.

The terminal handler 14 can transmit key-loading dialog messages to the server 22. The server 22 can transmit key-loading dialog messages to the key manager system 24. Messages transmitted between the terminal handler 14 and the server can be identified as key-loading dialog messages by including a particular message identifier or code. Key-loading dialog messages can include a step code that identifies a particular step or function of key loading that a particular key-loading message relates to. For example, key-loading dialog messages can be identified by a message code of 1401 and can include a step code, such as 0, 1, 2, 3, etc., that indicates a particular step of the key-loading dialog or process. For example, a key-loading dialog message with a step code of "0" can indicate that a terminal 12 is requesting a new key from the key manager system 24. Key-loading dialog messages can also include a terminal identifier that identifies a terminal associated with the key-loading dialog.

The server 22 can obtain key-loading dialog messages from the terminal handler 14 and can format the messages such that the key manager system 24 can accept and use the messages. The server 22 can also obtain key-loading dialog messages from the key manager system 24 and can route messages to one or more terminal 12 via the terminal handler 14. In some embodiments, the key manager system 24 can also directly transmit messages to the terminals 12 and/or the terminal handler 14.

In some embodiments, the server 22 can communicate with the key manager system 24 using TCP/IP.

The key manager system 24 can perform cryptographic operations, such as generating keys, encrypting information, and decrypting information. In some embodiments, the key manager system 24 includes an A98-R system provided by Trusted Security Solutions, Inc. The key manager system 24 can also include a host or hardware security module ("HSM"), such as those provided by Eracom® and Thales®. The key manager system 24 can include one or more tamper resistant security modules ("TRSMs"), which are configured such that cryptographic-protected data stored in the TRSMs is only in clear text form internally. In some embodiments, there is substantially no way to obtain the data in clear text form without destroying the data and/or the physical TRSM.

The server 22 can receive key-loading dialog messages from the terminal handler 14 and can create requests and messages based on the received messages. In some embodiments, the requests can include extensible markup language ("XML") requests. The server 22 can forward the requests to the key manager system 24. In some embodiments, the key manager system 24, rather than the server 22, can generate requests from the key-loading dialog messages sent from the server 22.

In some embodiments, cryptographic information included in messages sent to and/or from the key manager system 24 can be base-64 encoded. Traditionally, cryptographic information, such as keys, signed keys, and certificates, are binary-based and susceptible to errors when transmitted. Cryptographic information can be base-64 encoded in order to increase the accuracy of the transmitted information.

The key manager system 24 can process requests and messages received from the server 22 and can return a response. Each response can include one or more terminal identifiers that identify one or more terminals 12 associated with a response. In some embodiments, the key manager system 24 can send responses to the server 22, and the server 22 can send the response to the terminal handler 14. The terminal handler 14 can send the response to one or more terminals as identified in the response. In other embodiments, the key manager system 24 can send responses directly to the terminal handler 14 and/or the terminals 12.

In some embodiments, the server 22 and/or the key manager system 24 can create output which can be stored and/or updated to the terminal manager system 13. For example, the server 22 and/or the key manager system 24 can update information stored in the environment database 21.

Figure 3:
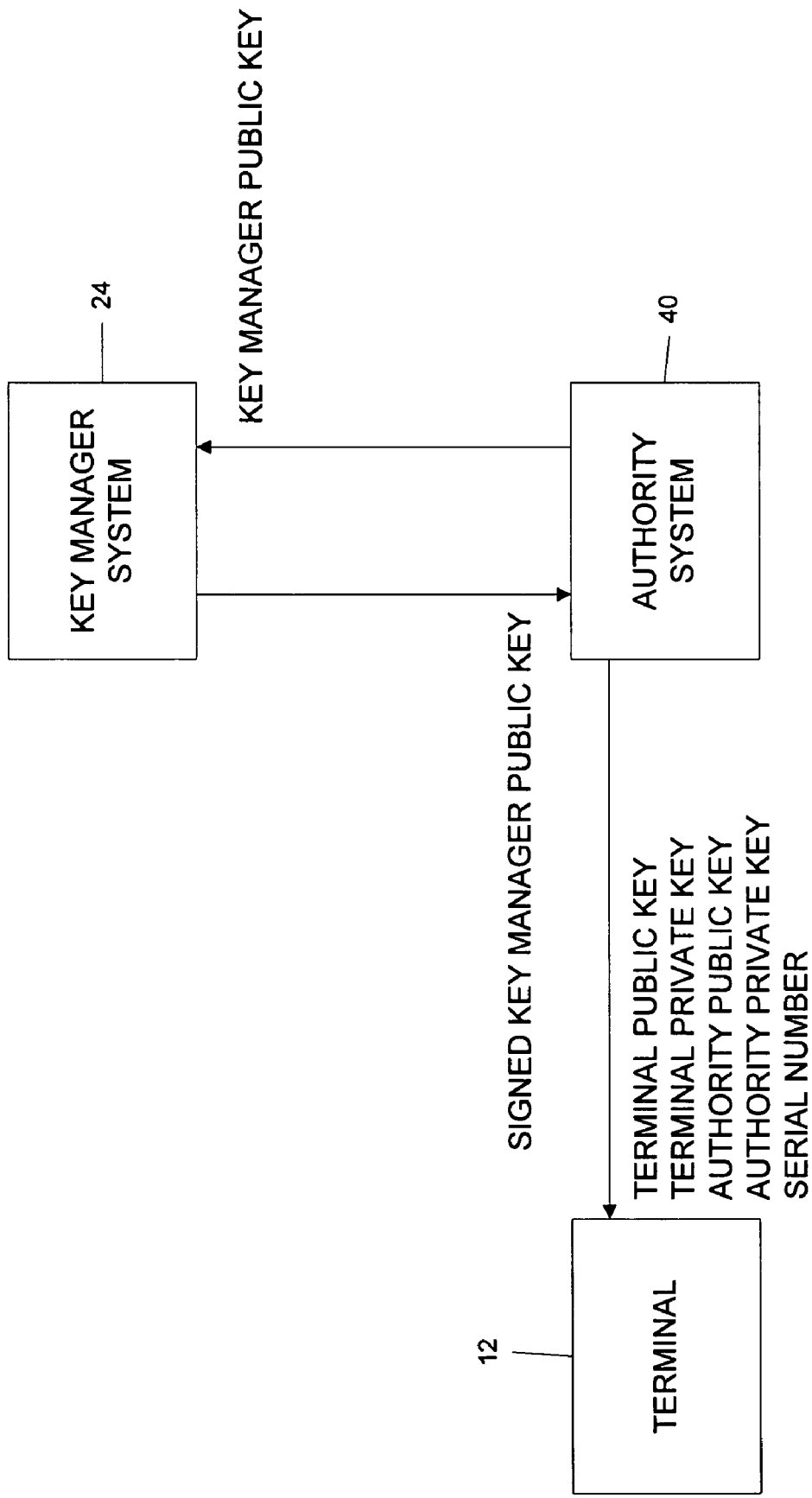
FIGS. 3-5D illustrate a process of setting-up a financial transaction system according to some embodiments of the invention.

To set-up the system 10 to perform key loading, components of the system 10 can be initially provided with cryptographic information. FIG. 3 illustrates a set-up process performed between a terminal 12, a manufacturer or authority system 40, and the key manager system 24 according to one embodiment of the invention. As shown in FIG. 3, the authority system 40 can send the terminal 12 a terminal public key, a terminal private key, an authority public and an authority private key. The terminal 12 can use the terminal public key, the terminal private key, the authority public key, and the authority private key to securely exchange information in a cryptographic system using public keys and private keys. Public private key cryptography systems use two keys to securely provide information to a receiver. A first key, a public key of a receiver, can be provided to individuals who want to securely provide information to the receiver. Individuals with the public key can encrypt information for the receiver with the public key. A second key, a private key of the receiver, is kept secret by the receiver and is used by the receiver to decrypt information encrypted with the public key of the receiver. Public keys and private keys are different keys and one key cannot be used to derive the other key. Thus, as long as a receiver retains their private key secret, only the receiver can decrypt information encrypted with the receiver's public key.

In some embodiments, the terminal 12 can generate the terminal public key and/or the terminal private key rather than receiving them from the authority system 40.

The terminal 12 can include a serial number sent from the authority system 40. The serial number and the terminal public key and the terminal private can be unique for each terminal 12.

As shown in FIG. 3, the authority system 40 can send the key manager system 24 the authority public key. The key manager system can store the authority public key. The key manager system 24 can send the authority system 40 a key manager public key. The authority system 40 can sign the key manager public key and can return the signed key manager public key to the key manager system 24. The key manager system can store the signed key manager public key. The key manager system 24 can also store a key manager private key (associated with the key manager public key).

Signing a key (or another piece of information) includes encrypting a piece of information with a private key of a public key and a private key pair. Signed information can be authenticated as being sent from a particular individual, if a receiver of the signed data can decrypt the signed data using a corresponding public key of the individual. For example, if a sender has a public key and a private key, the sender can encrypt information with the private key and can provide the encrypted information to a receiver. The receiver can obtain the public key and can verify that the sender sent the encrypted information if the receiver can decrypt the encrypted information with the public key of the sender. Since only the sender knows the private key, if the receiver can decrypt the signed information with the corresponding public key, then only the sender could have created the signed information.

Figure 4:
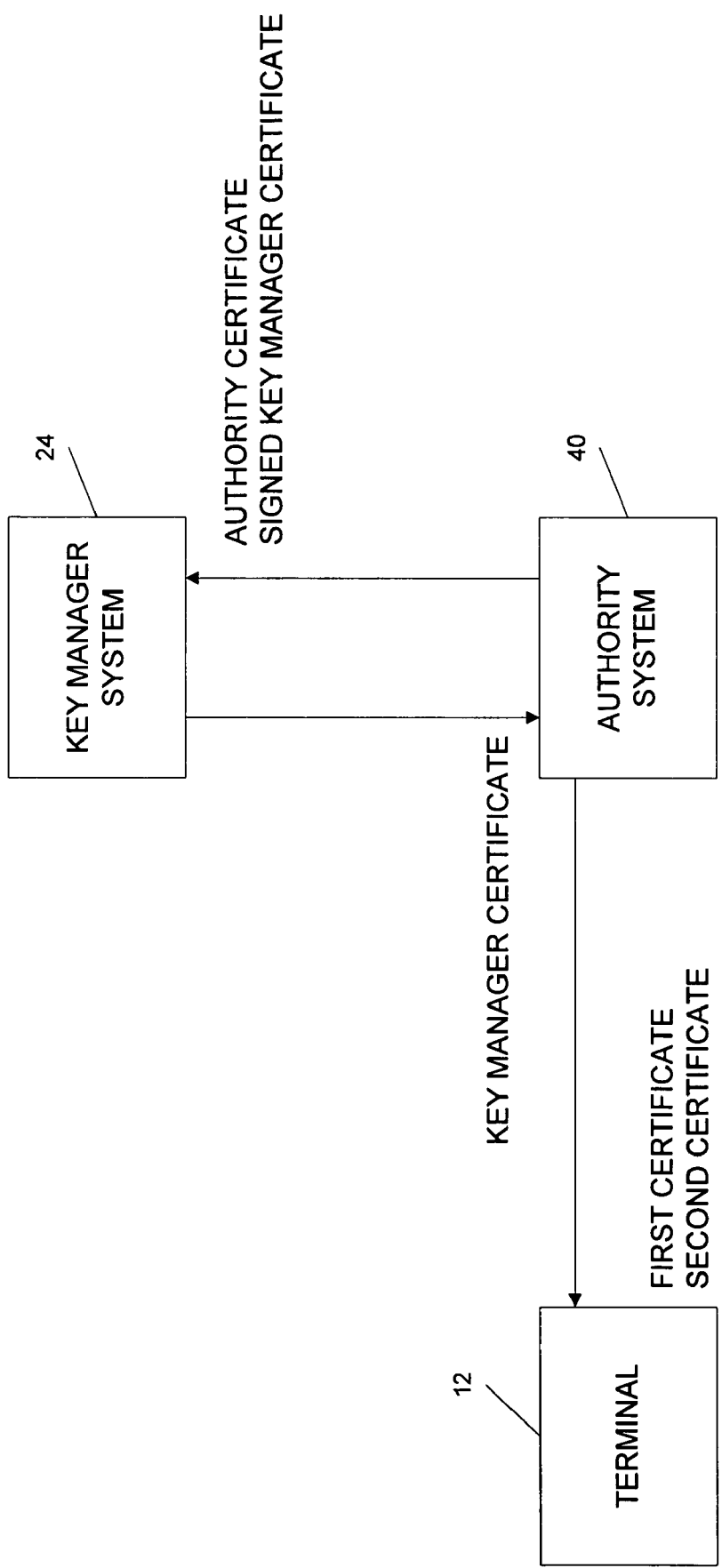

FIG. 4 illustrates a set-up process performed between a terminal 12, the authority system 40, and the key manager system 24 according to one embodiment of the invention. As shown in FIG. 4, in some embodiments, the authority system 40 sends a terminal 12 a first certificate and a second certificate rather than the terminal public key, the terminal private key, the authority public key, and the authority private key.

Certificates include a public key signed by a trusted and authorized certificate provider (e.g., VeriSign®, Inc.). Certificates can include additional information, such as the name, address, etc. of the individual associated with the public key included in the certificate.

The first certificate can include the terminal public key. The second certificate can include the authority public key. In some embodiments, the first certificate and/or the second certificate can include an identifier of the terminal 12. The first certificate and the second certificate can be signed by the authority private key of the authority system 40 and/or another trusted certificate provider.

As shown in FIG. 4, the authority system 40 can send an authority certificate to the key manager system 24. The authority certificate can include the authority public key. The authority certificate can include the authority public key signed by a certificate provider. The public key of the certificate provider can be well known, and the key manager system 24 can use the public key of the certificate provider to obtain the authority public key.

The key manager system 24 can send a key manager certificate to the authority system 40. The key manager certificate can include the key manager public key, which can be signed by a certificate provider. The authority system 40 can sign the key manager certificate by encrypting the key manager certificate with the authority private key. The authority system 40 can send the signed key manager certificate to the key manager system 24.

The set-up processes shown in FIGS. 3 and 4 include the key manager system 24 directly exchanging cryptographic information with the authority system 40. In some embodiments, as shown in FIGS. 5A-5D, the terminal manager system 13 can be included in the set-up process and can act as an intermediary system between the key manager system 24 and the authority system 40.

Figure 5A:
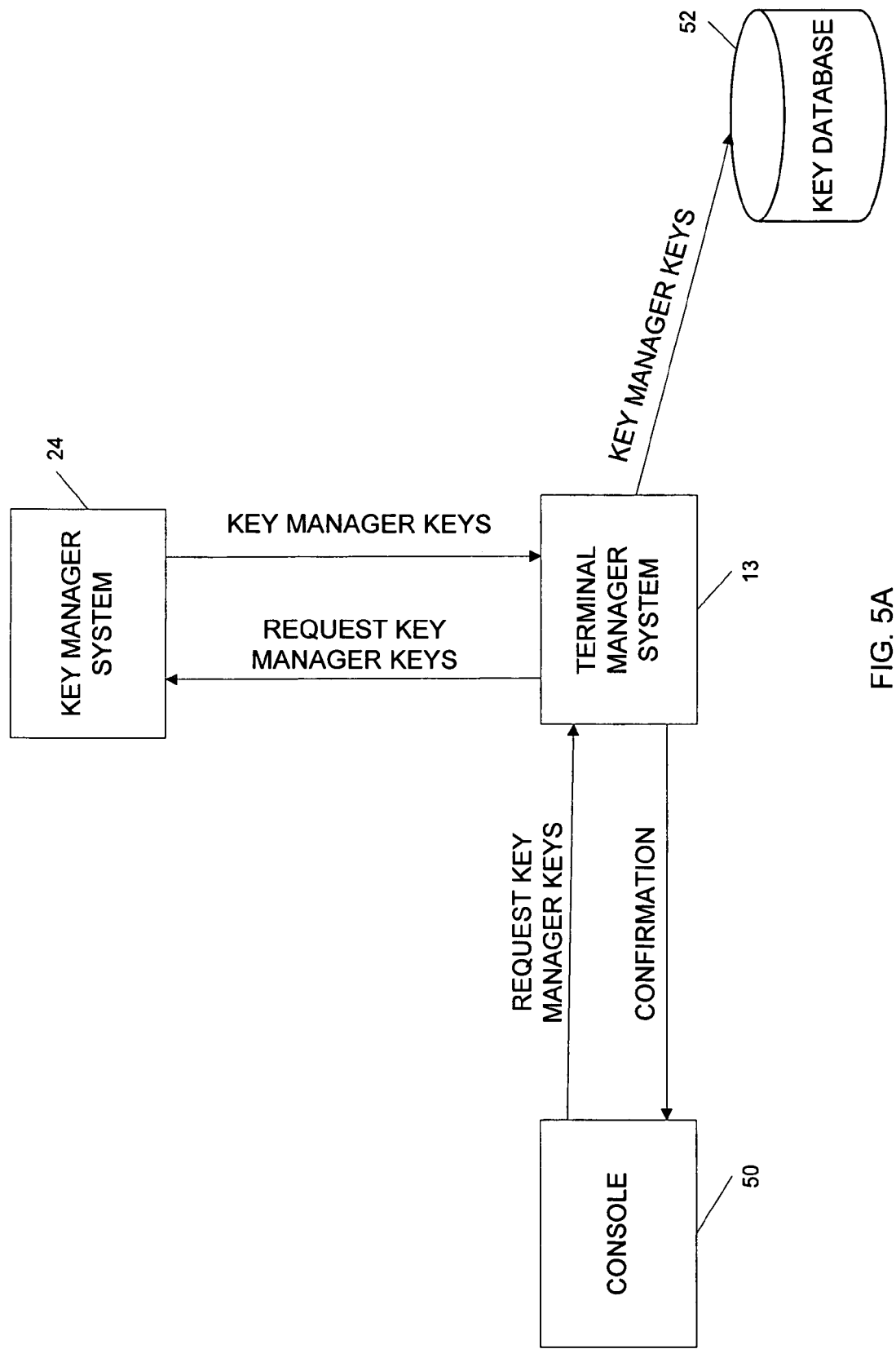

As shown in FIG. 5A, to generate the key manager public key and the key manager private key, an analyst of the terminal manager system 13 can use a terminal manager console (hereinafter "console") 50 to generate a first request. The first request can include a request for generating the key manager public key and the key manager private key. The console 50 can send the request to the terminal manager system 13. The terminal manager system 13 can request the key manager public key and the key manager private key from the key manager system 24. The key manager system 24 can generate the key manager public key and the key manager private key and can send the keys to the terminal manager system 13. The terminal manager system 13 can store the generated keys to a key database 52. In some embodiments, the key database 52 can be managed with terminal manager system 13 (e.g., the key file included in the environment database 21). In other embodiments, the key database 52 can be managed with the key manager system 24. In still other embodiments, the key database 52 can be external to the terminal manager system 13 and the key manager system 24. The key database 52 can store keys generated by the key manager system 13 and/or keys provided from other sources, such as the authority system 40. The keys stored in the key database 52 can include keys used to verify signatures and keys used to encrypt information entered into a pin-pad 30 of a terminal 12. In some embodiments, the terminal manager system 13 can include a key management application that an analyst or operator of the terminal manager system 13 can use to manage and store keys stored in the key database 52. The key database 52 can also include key identifiers, such as names. The key identifiers can be passed between components of the system 10, rather than actual keys, in order to increase the security of keys.

In some embodiments, after the terminal manager system 13 stores the key manager public key and the key manager private key to the key database 52, the terminal manager system 13 can send a confirmation message to the console 50. The confirmation message can notify the terminal manager system analyst that the key manager public key and the key manager private key were generated and stored to the key database 52.

Figure 5B:
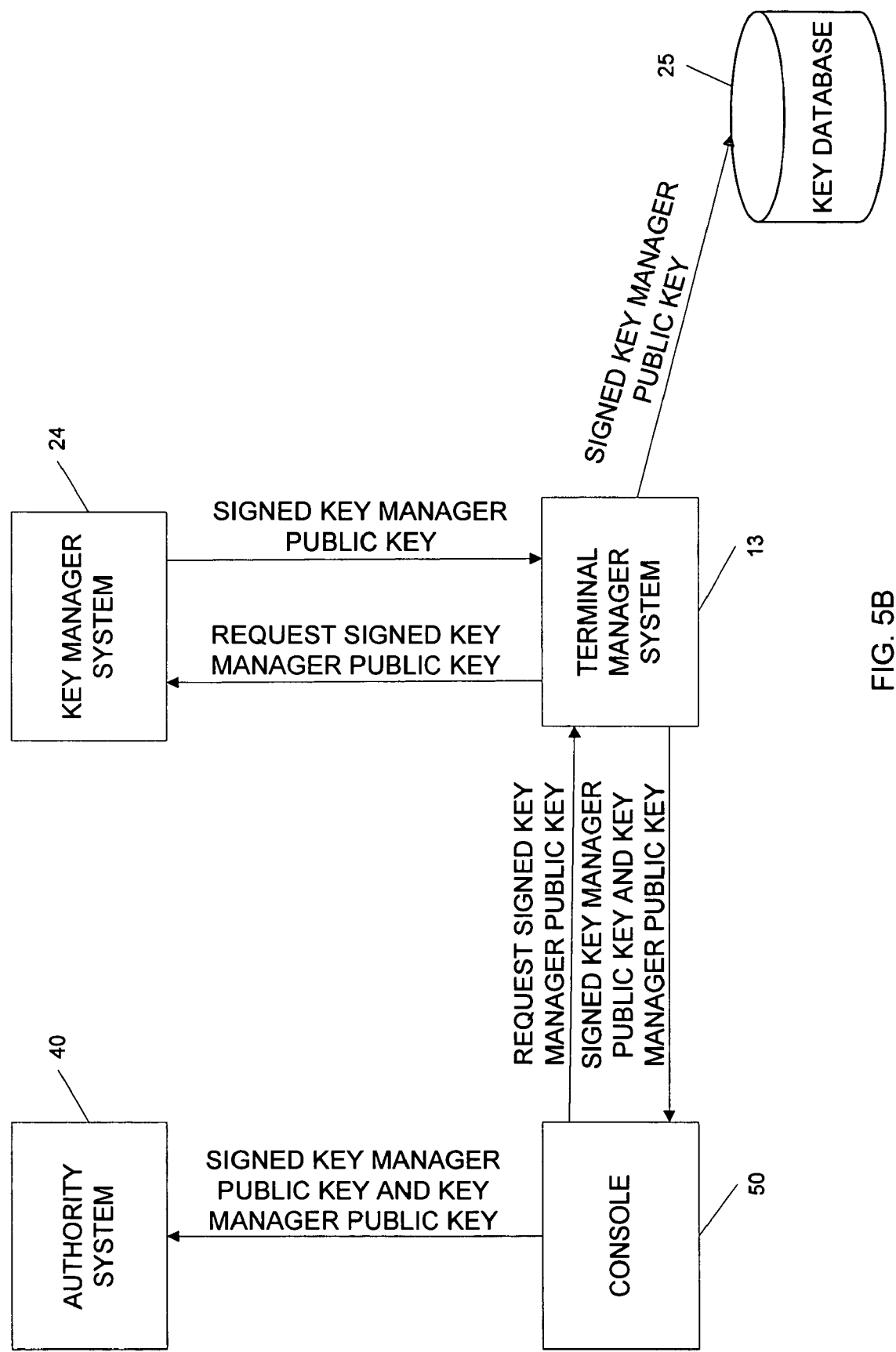

As shown in FIG. 5B, an analyst of the terminal manager system 13 can use the console 50 to generate a second request for the key manager public key signed with the key manager private key ("a key manager signature"). The analyst can also request a hash. A hash can be generated from a hash function. A hash function takes, as input, a first number, string of text, etc., and generates another (often smaller) number, string of text, etc. A hash function can be a one-way function that is relatively easy to compute (i.e., easy to generate a hash of input) and significantly harder to reverse (i.e., hard to determine the input from a hash).

The console 50 can send the second request to the terminal manager system 13. The terminal manager system 13 can request the key manager signature from the key manager system 24. The key manager system 24 can generate the key manager signature by signing the key manager public key with the key manager private key. In some embodiments, the key manager system 24 can obtain the key manager public key and the key manager private key from the key database 52.

The key manager system 24 can return the key manager signature to the terminal manager system 13, and the terminal manager system 13 can store the key manager signature to the key database 52.

If the analyst requested a hash, the terminal manager system 13 can request a hash from the key manager system 24. For example, the key manager system 24 can generate a hash of the key manager signature and the key manager public key. In some embodiments, the key manager system 24 can obtain the key manager signature and/or the key manager public key from the key database 52. The key manager system 24 can send the hash to the terminal manager system 13, and the terminal manager system 13 can send the hash to the console 50.

The terminal manager system 13 can send the key manager public key and the key manager signature to the console 50. The analyst can provide the key manager public key, the key manager signature, and the hash (if applicable) to the authority system 40. In some embodiments, the console 50 can transmit the information to the authority system 40 over a network. The console 50 can also store the key manager public key and the key manager signature on a diskette or another portable data storage mechanism. The analyst can mail or deliver the diskette to the authority system 40. In some embodiments, the analyst can write or print the hash on a form and can mail or deliver the form to the authority system 40.

Figure 5C:
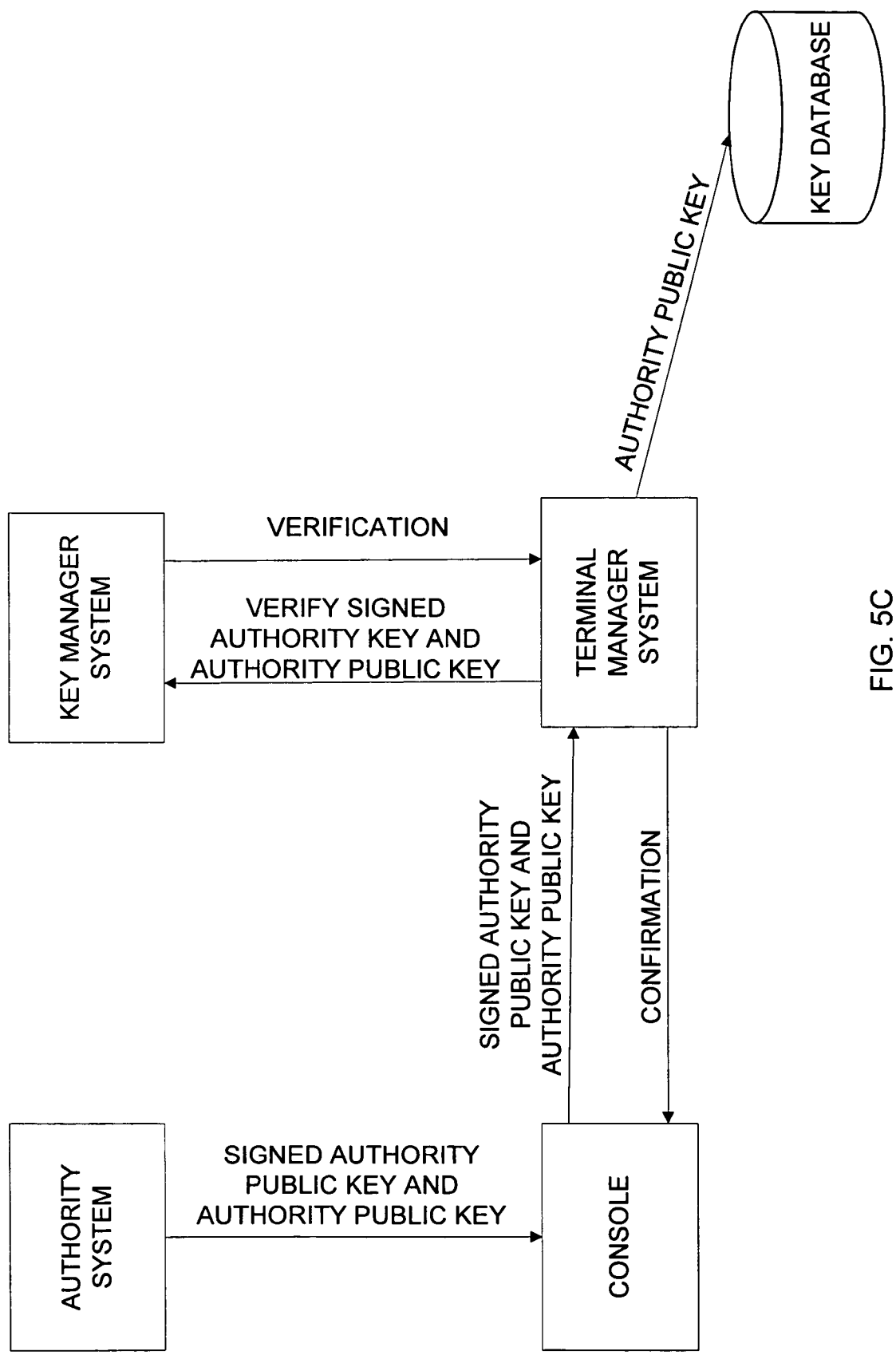

After the authority system 40 obtains the key manager public key, the key manager signature, and the hash (if applicable), the authority system 40 can send the analyst the authority public key and the authority key signed with the authority private key ("an authority signature") (FIG. 5C). In some embodiments, the authority system 40 can send the analyst a hash. The hash can include a hash of the authority public key and the authority signature. In some embodiments, the authority system 40 can send the authority public key, the authority signature, and/or the hash to the console 50 over a network. In other embodiments, the authority system 40 can store the authority public key and the authority signature to a diskette or other portable data storage mechanism and can mail or deliver the diskette to the analyst. The analyst can use the console 50 to obtain the information stored on the diskette. The authority system 40 can also write or print the hash on a form and can mail or mail the form to the analyst, and the analyst can enter the hash into the console 50 using an input mechanism, such as a keypad.

The console 50 can send the authority public key, the authority signature, and the hash (if applicable) to the terminal manager system 13. If the terminal manager system 13 obtains a hash from the console 50, the terminal manager system 13 can send the authority public key and the authority signature to the key manger system 24 and can request a hash. The key manager system 24 can generate a hash of the authority public key and the authority signature and can return the hash to the terminal manager system 13. The terminal manager system 13 can compare the hash provided from the authority system 40 to the hash generated with the key manager system 24. If the hashes match, the terminal manager system 13 can verify that the authority public key and the authority signature were received without errors. If the hashes do not match, the terminal manager system 13 can inform the analyst (via the console 50) that the authority public key and/or the authority signature were received with errors. In some embodiments, the analyst can contact the authority system 40 and can request that the authority system resend the authority public key, the authority signature, and the hash (if applicable).

If the hashes match or if the authority system 40 did not provide a hash, the terminal manager system 13 can ask the key manager system 24 to verify the authority signature. The key manager can verify the authority signature by decrypting the authority signature with the authority public key. If the decrypted authority signature does not match the authority public key, the key manager system 24 can send a message to the terminal manager system 13 indicating that the authority signature is not verified. In some embodiments, if the authority signature is not verified, the terminal manager system 13 can inform the analyst (via the console 50) that the authority signature is not verified. The analyst can contact the authority system 40 and can request that the authority system 40 resend the authority public key, the authority signature, and the hash (if applicable).

In some embodiments, if the key manager system 24 verifies the authority signature (i.e., the decrypted authority signature matches the authority public key), the key manager system 24 can generate a message authentication code ("MAC"). A MAC can include information used to authenticate other information. A MAC algorithm can accept as input information and can produce a MAC. In some embodiments, a MAC algorithm can create a one-way hash of information and can encrypt the hashed information with a key. The key manager system 24 can generate a MAC associated with the authority public key by generating a hash of the authority public key and encrypting it with the authority public key. The key manager system 24 can return the MAC to the terminal manager system 13, and the terminal manager system 13 can store the MAC to the key database 52. The key manager system 24 can use the MAC stored to the key database 52 to verify that the authority public key has not be modified. The next time the key manager system 24 obtains the authority public key from the key database 52, the key manager system 24 can also obtain the stored MAC. The key manager system can generate a new MAC of the authority public key obtained from the key database 52 and can compare the new MAC with the MAC obtained from the key database 52. If the new MAC is the same as the MAC obtained from the key database 52, the key manager system 24 can verify that the authority public key was not modified.

The terminal manager system 13 can store the authority public key to the key database 52. In some embodiments, the terminal manager system 13 can send a confirmation message to the console 50. The console 50 can provide the confirmation message to the analyst in order to inform the analyst that the authority signature was verified and that the authority public key and the associated MAC (if applicable) were stored in the keys database 52.

Figure 5D:
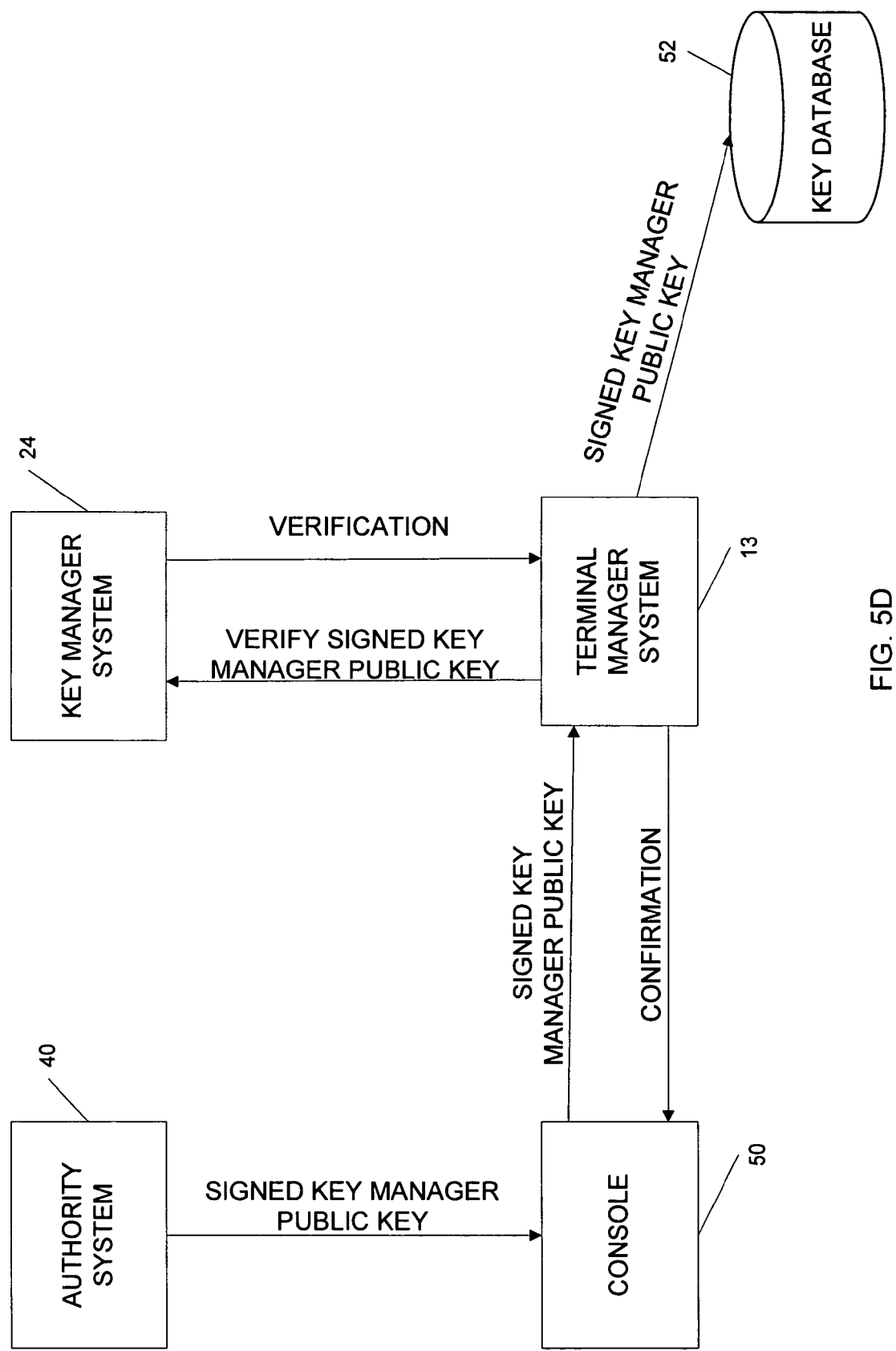

As shown in FIG. 5D, the authority system 40 can send the key manager public key, which was previously sent to the authority system 40 (see FIG. 5B), and a signed key manager public key to the analyst. The signed key manager signature can include the key manager public key signed or encrypted with the authority private key.

In some embodiments, the authority system 40 can also send a hash to the analyst. The hash can include a hash of the key manager public key and the signed key manager public key.

In some embodiments, the authority system 40 can transmit the signed key manager public key and the hash (if applicable) to the console 50 over a network. In other embodiments, the authority system 40 can store the key manager public key and the signed key manager public key to a diskette or another portable data storage mechanism and can mail or deliver the diskette to the analyst. The analyst can use the console 50 to obtain and transmit the information. The authority system 40 can also write or print the hash on a form and can mail or deliver the form to the analyst. The analyst can enter the hash into the console 50 using an input mechanism, such as a keypad.

The console 50 can send the key manager public key, the signed key manager public key, and the hash (if applicable) to the terminal manager system 13.

If the authority system 40 sent a hash, the terminal manager system 13 can send the key manager public key and the signed key manager public key to the key manager system 13. The key manager system 13 can generate a hash of the key manager public key and the signed key manager public key and can return the hash to the terminal manager system 13. The terminal manager system 13 can compare the hash generated with the key manager system to the hash sent from the authority system 40. If the hashes match, the terminal manager system 13 can confirm that the key manager public key and the signed key manager public key were received without errors. In some embodiments, if the hashes do not match, the terminal manager system 13 can send an error message to the analyst (via the console 50). The error message can inform the analyst that the key manager public key and/or the signed key manager public key were received with errors. In some embodiments, the analyst can contact the authority system 40 and can request that the authority system 40 re-send the key manager public key, the signed key manager public key, and the hash.

If the hashes match or if the authority system 40 did not provide a hash, the terminal manager system 13 can ask the key manager system 24 to verify the signed key manager public key. The key manager system 24 can verify the signed key manager public key by decrypting the signed key manager public key with the authority public key, which the authority system 40 previously sent to the key manager system 24 (FIG. 5C). In some embodiments, the key manager system 24 can obtain the authority public key from the key database 52. If the signed key manager public key decrypted with the authority public key does not match the key manager public key, the key manager system 24 can send an error message to the terminal manager system 13. In some embodiments, if the signed key manager public key is not verified, the terminal manager system 13 can send the error message to the analyst (via the console 50). The analyst can contact the authority system 40 and can request that the authority system 40 resend the key manager public key, the signed key manager public key, and the hash (if applicable).

In some embodiments, if the key manager system 24 verifies the signed key manager public key (i.e., the decrypted signed key manager public key matches the key manager public key), the key manager system 24 can generate a MAC, as described with respect to FIG. 5C, associated with the signed key manger public key. The key manager system 24 can return the MAC to the terminal manager system 13, and the terminal manager system 13 can store the MAC to the key database 52.

The terminal manager system 13 can store the signed key manager public key to the key database 52. In some embodiments, the terminal manager system 13 can send a confirmation message to the console 50. The console 50 can provide the confirmation message to the analyst in order to inform the analyst that the signed key manager public key was verified and that the signed key manager public key and the generated MAC (if applicable) were stored in the keys database 52.

The setup-up process shown in FIGS. 5A-5D can also be used to establish and exchange cryptographic information that includes certificates. In some embodiments, the terminal manager system 13, the authority system 40, and/or the key manager system 24 can interact with a certificate authority to have their public keys and other related information signed by a trusted individual or organization.

The cryptographic information can be sent by secure means. For example, the terminal public/private key pair and the authority public/private key pairs can be generated by the authority system and directly or hand-programmed into the terminal 12, such that information is not communicated across an unsecure communication mechanism. In some embodiments, information can be exchanged by storing information to a diskette or another data storage mechanism and mailing or delivering the diskette. Information can also be transmitted over a secure network, such as network that transmits information using a secure socket layer ("SSL").

Before providing a key to a terminal 12, the terminal 12 and the key manager system 24 can authenticate themselves with each other. In some embodiments, the terminal 12 and the key manager system 24 can exchange cryptographic information, such as the cryptographic information described with respect to FIGS. 3, 4, and 5A-5D.

Figure 6A:
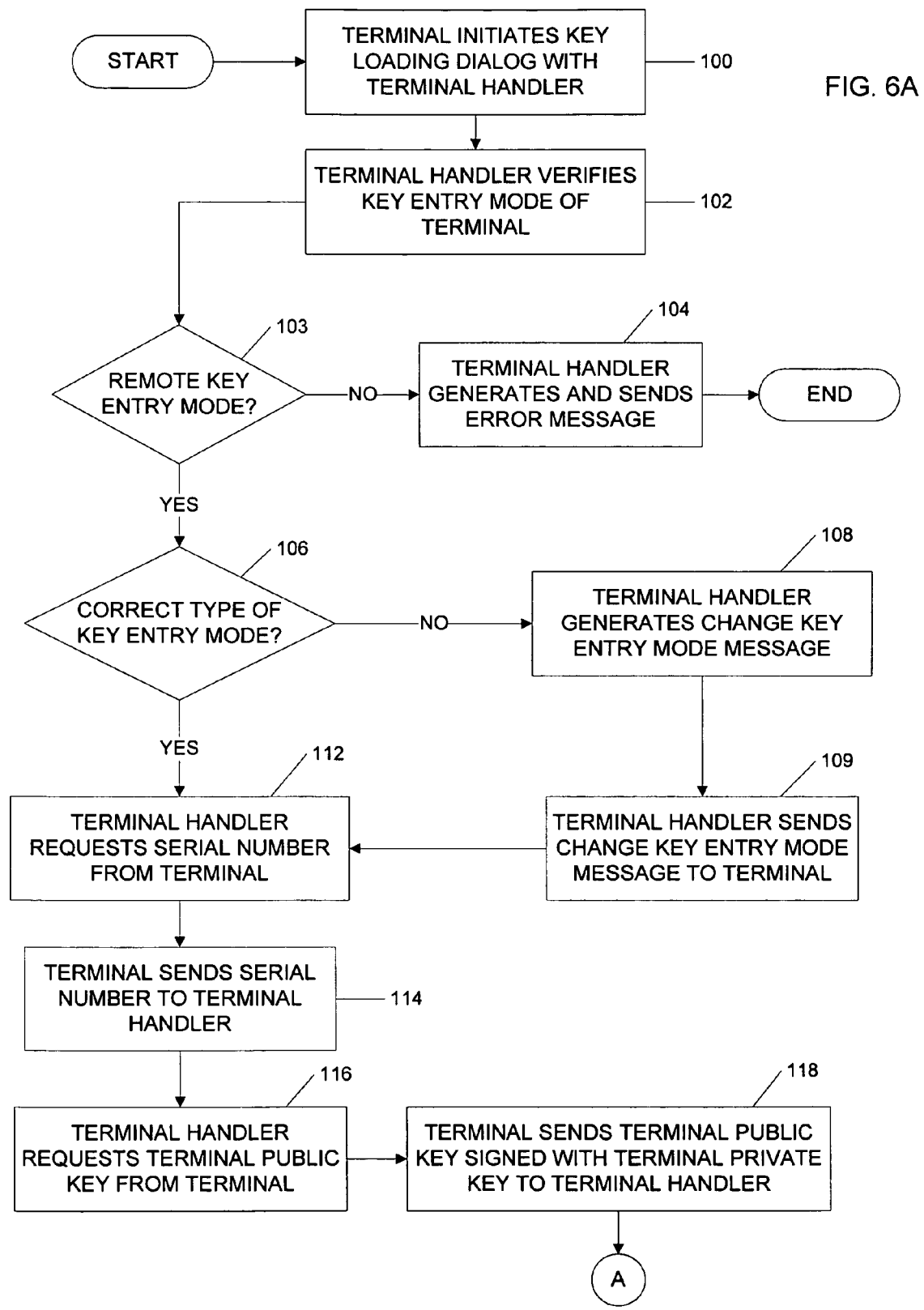

FIGS. 6A-6B illustrate a process of authenticating a terminal 12 with the key manager system 24 according to one embodiment of the invention. The authentication process shown in FIGS. 6A-6B can use the cryptographic information described with respect to FIG. 3.

As shown in FIG. 6A, the terminal 12 can initiate a key-loading dialog with the terminal handler 14 (step 100). In some embodiments, the terminal 12 is configured to determine when a key is needed, such as at power-up or boot-up. In other embodiments, an analyst or operator of the terminal manager system can use a system monitor console to initiate a key-loading dialog with the terminal handler 14.

In some embodiments, when the terminal 12 (or an analyst or operator of the terminal manager system 13) initiates a key-loading dialog, the terminal handler 14 can check a key entry mode of the terminal 12 (step 102). For example, the terminal handler 14 can send a key entry mode request to the terminal 12, and the terminal 12 can send a key entry mode response. The key entry mode response can include a key entry mode that indicates if the terminal 12 is configured to receive a key from the key manager system 24. The key entry mode can also indicate a type of key accepted by the terminal 12, such as a DES key that includes 56 bits or a 3DES key that includes 112 bits.

If the key entry mode indicates that the terminal 12 cannot remotely accept a key from the key manager system 24 (step 103), the terminal handler 14 can generate and send an error message to the terminal 12 and/or the network monitor console (step 104).

In some embodiments, if the key entry mode indicates that the terminal 12 can accept keys from the key manager system 24, the terminal handler 14 can use the key entry mode sent from the terminal 12 to determine if the terminal 12 can remotely accept a particular key (step 106). For example, the terminal handler 14 can determine if the terminal 12 can accept a 3DES key. If the terminal 12 cannot accept a particular type of key, the terminal handler 14 can generate a change key entry mode message to the terminal 12 (step 108). The change key mode entry message can instruct the terminal 12 to use a particular key, such as a 3DES key. The terminal handler 14 can send the change key entry mode message to the terminal 12 (step 109).

As shown in FIG. 6A, the terminal handler 14 can request the serial number from the terminal 12 (step 112). The terminal 12 can send the serial number to the terminal handler 14 signed with the authority private key (step 114).

After the terminal handler 14 obtains the signed serial number, the terminal handler 14 can request the terminal public key (step 116). The terminal 12 can send the terminal public key to the terminal handler 14 signed with the authority private key (step 118).

As shown in FIG. 6B, after the terminal handler 14 obtains the signed serial number and the signed terminal public key the terminal handler 14 can create an authentication request (step 119). The authentication request can include the signed serial number and the signed terminal public key. The authentication request can also include a terminal identifier, which identifies a terminal requesting authentication with the key manager system 24. The terminal handler 14 can send the authentication request to the server 22 (step 120), and the server 22 can send the authentication request to the key manager system 24 (step 122).

After the key manager system 24 obtains the authentication request, the key manager system can use the authority public key, previously provided by the authority system (FIG. 3), to decrypt the signed serial number and the signed terminal public key and obtain the serial number and the terminal public key (step 124). The key manager system 24 can then generate an authentication response (step 126). The authentication response can include the signed key manager public key, which was previously provided by the authority system (FIG. 3). The authentication response can also include a terminal identifier. The key manager system 24 can send the authentication response to the server 22 (step 127).

The server 22 can send the authentication response to the terminal handler 14 (step 128), and the terminal handler 14 can send the authentication response to the terminal 12 (step 130). The server 22 can use the terminal identifier included in the authentication response to determine a particular terminal handler to send the authentication response to. In some embodiments, the terminal handler 14 can use the terminal identifier to determine a particular terminal to send the authentication response to.

When the terminal 12 obtains the authentication response, the terminal handler 12 can use the authority private key, which was previously provided from the authority system 40 (FIG. 3), to decrypt the signed key manager public key and obtain the key manager public key (step 132). In some embodiments, after the terminal 12 obtains the key manager public key, the terminal 12 can generate and send a confirmation message to the terminal handler 14 (step 134). The terminal handler 14 can send the confirmation message to the server 22 (step 136) and the server 22 can send the confirmation message to the key manager system 24 (step 138).

After the terminal 12 obtains the key manager public key, the terminal 12 and the key manager system 24 each possess each other's public key.

Figure 6C:
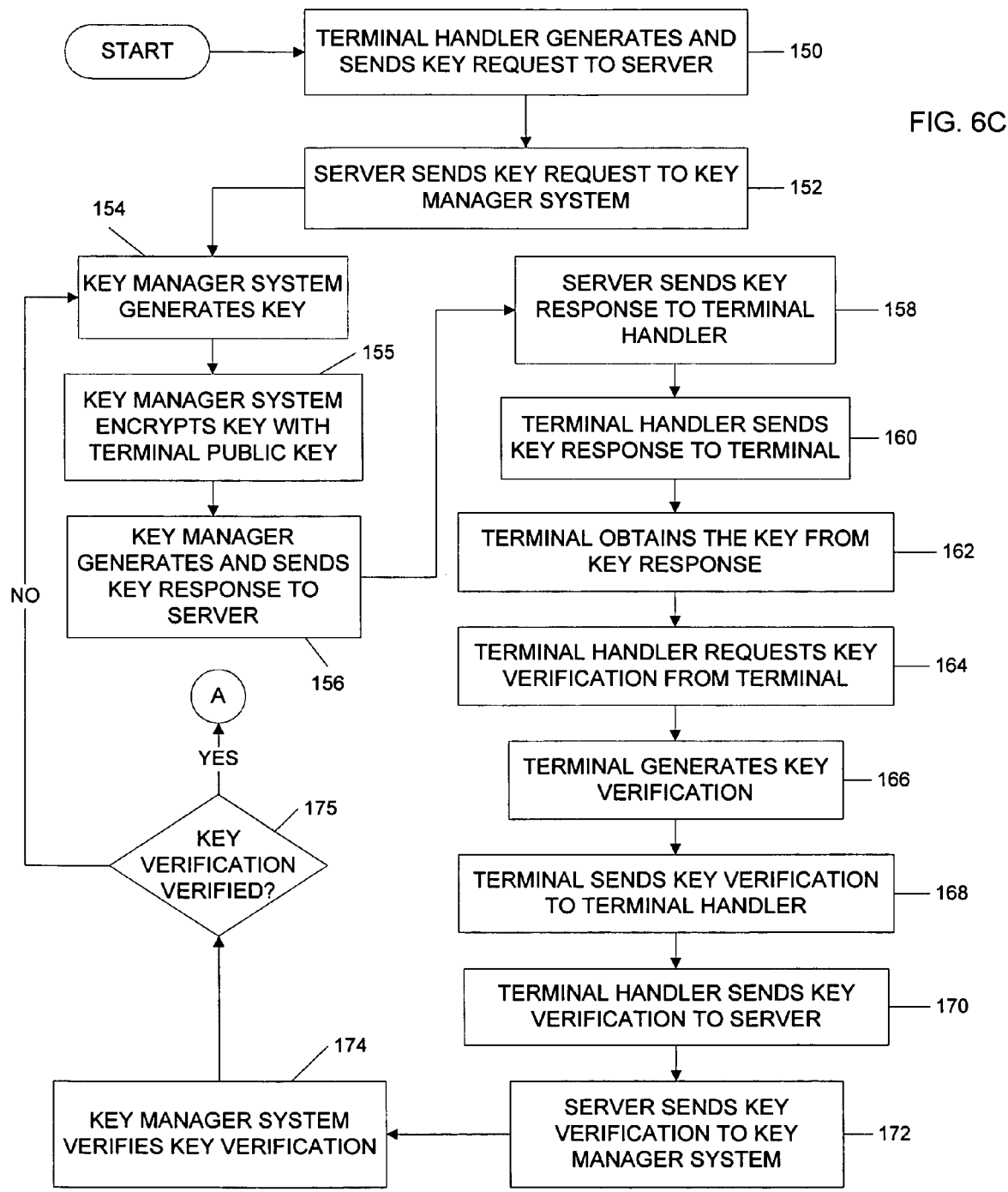
FIGS. 6C-6D illustrate a process of loading a key to a terminal from the key manager system of the financial transaction system of FIG. 1 according to one embodiment of the invention.
Figure 6D:
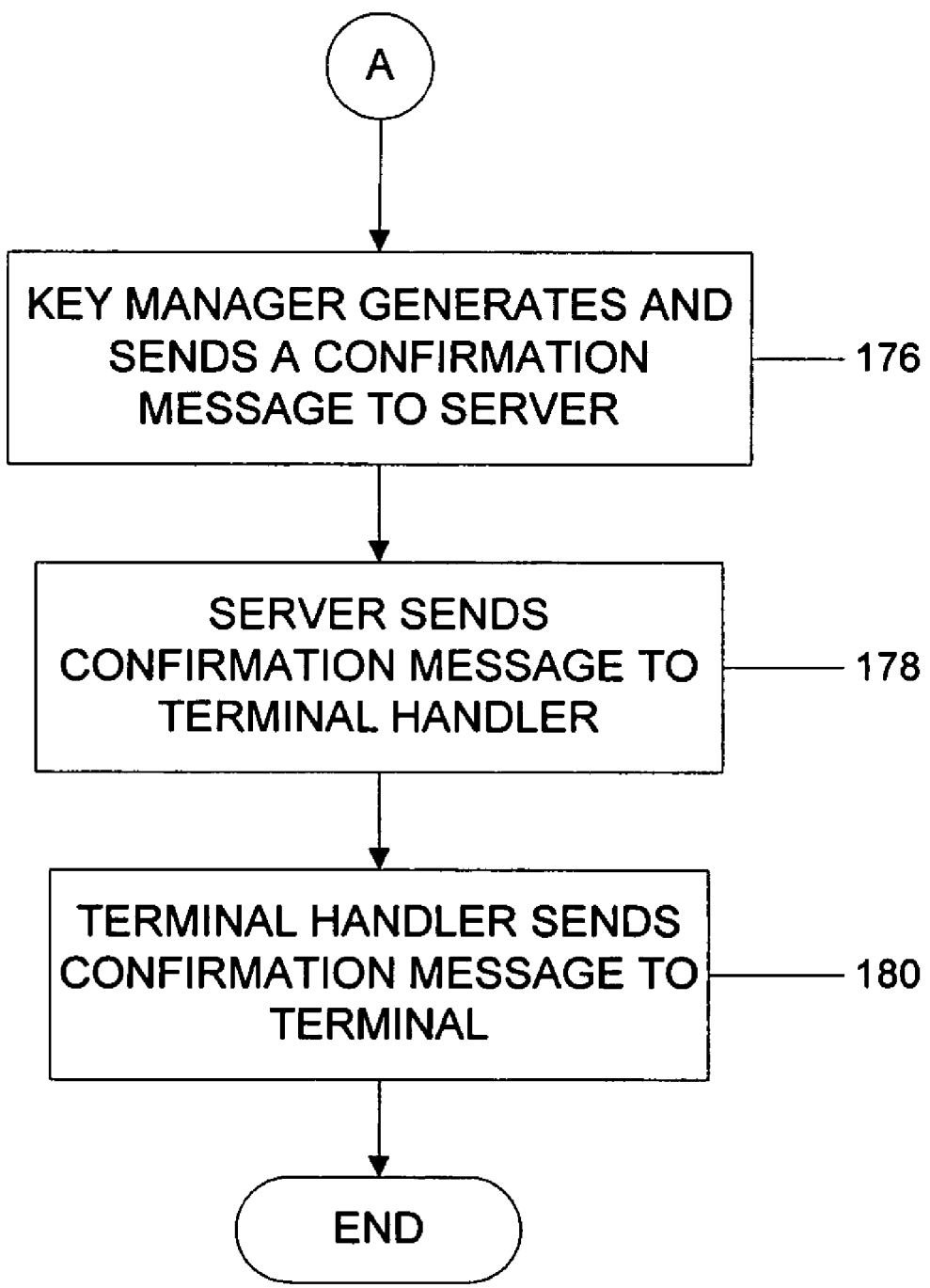

FIGS. 6C-6D illustrate a process of loading a key to the terminal 12 after the terminal 12 and the key manager system 24 have exchanged public keys as described with respect to FIGS. 6A-6B. As shown in FIG. 6C, the terminal handler 14 can generate and send a key request to the server 22 (step 150). In some embodiments, the key request can include a terminal identifier. The server 22 can send the key request to the key manager system 24 (step 152).

After the key manager system 24 obtains the key request, the key manager system 24 can generate a key for the terminal 12 (step 154). In some embodiments, the key can include a 3DES key. The key manager system 24 can sign or encrypt the key with the terminal public key, which was exchanged during the authentication process described with respect to FIG. 3 (step 155). The key manager system 24 can generate and send a key response to the server 22 (step 156). The key response can include the encrypted key and additional information (e.g., a terminal identifier). The server 22 can send the key response to the terminal handler 14 (step 158). The terminal handler 14 can send the key response to the terminal 12 (step 160). In some embodiments, the server 22 and/or the terminal handler 14 can use information included in the key response, such as a terminal identifier to determine where to send the key response.

The terminal 12 receives the key response and can decrypt the encrypted key using the terminal private key and obtain the key (step 162). In some embodiments, the terminal 12 can generate and send a confirmation message to the terminal handler 14 after obtaining the key (step 162).

As shown in FIG. 6C, terminal handler 14 can request key verification from the terminal 12 after receiving the confirmation message (step 164). For example, the terminal handler 14 can request check digits from the terminal 12 as key verification. The terminal 12 can generate key verification (step 166) and can send the key verification to the terminal handler 14 as key verification (step 168).

The terminal handler 14 can send the key verification to the server 22 (step 170), and the server 22 can send the key verification to the key manager system 24 (step 172). The key manager system 24 can use to the key verification to verify that the terminal 12 received the key without errors (step 174). In some embodiments, the key manager system 24 can separately generate key verification based on the key. The key manager system 24 can compare the generated key verification with the key verification received from the terminal 12. If the generated key verification, such as the check digits, does not match key verification received from the terminal 12 (step 175), the key manager system 24 can generate another key (step 154), encrypt the key with the terminal public key (step 155), and can send the encrypted key to the server 22 (step 156).

As shown in FIG. 6D, if the generated key verification matches key verification received from the terminal 12 (step 175), the key manager system 24 can generate and send a confirmation message to the server 22 (step 176). The server 22 can forward the confirmation message to the terminal handler 14 (step 178). In some embodiments, the terminal handler 14 can send the confirmation message to the terminal 12 (step 180). The terminal 12 can use the confirmation message as an indication to store the key to the memory module 36 of the pin-pad 30 and to use the key to encrypt information entered in the pin-pad 30 before transmitting information to the terminal manager system 13 and/or another system.

In some embodiments, the key manager system 24 can send a copy of the key to the terminal manager system 13 and/or another system, such as a financial institution system, so that the terminal manager system 13 and/or another system can decrypt information sent from the terminal 12. The terminal manager system 13 can store the key. For example, the terminal manager system 13 can store the key in the key file included in the environmental database 21 and/or to the key database 52. In some embodiments, the key manager system 24 can encrypt the generated key before providing the key to the terminal manager system 13. For example, the key manager system 24 can encrypt the key with a terminal manager public key, and the terminal manager system 24 can decrypt the encrypted key with a corresponding terminal manager private key. Rather than providing the key to the terminal manager system 13, the terminal manager system 13 can request the key, decryption with the key, and/or encryption with the key when needed.

Figure 7A:
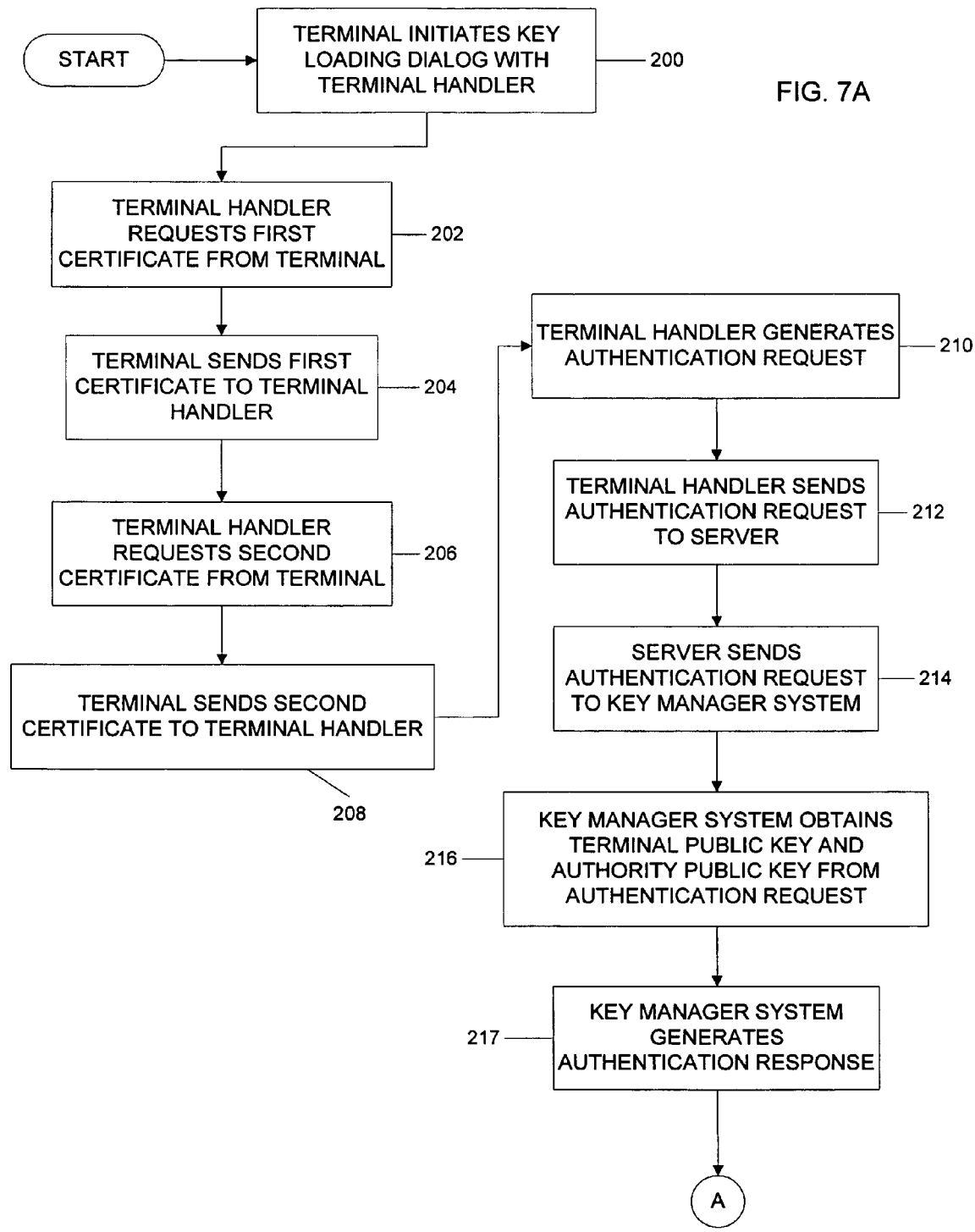
FIGS. 7A-7B illustrate a process of authenticating a terminal with the key manager system of the financial transaction system of FIG. 1 according to one embodiment of the invention.
Figure 7B:
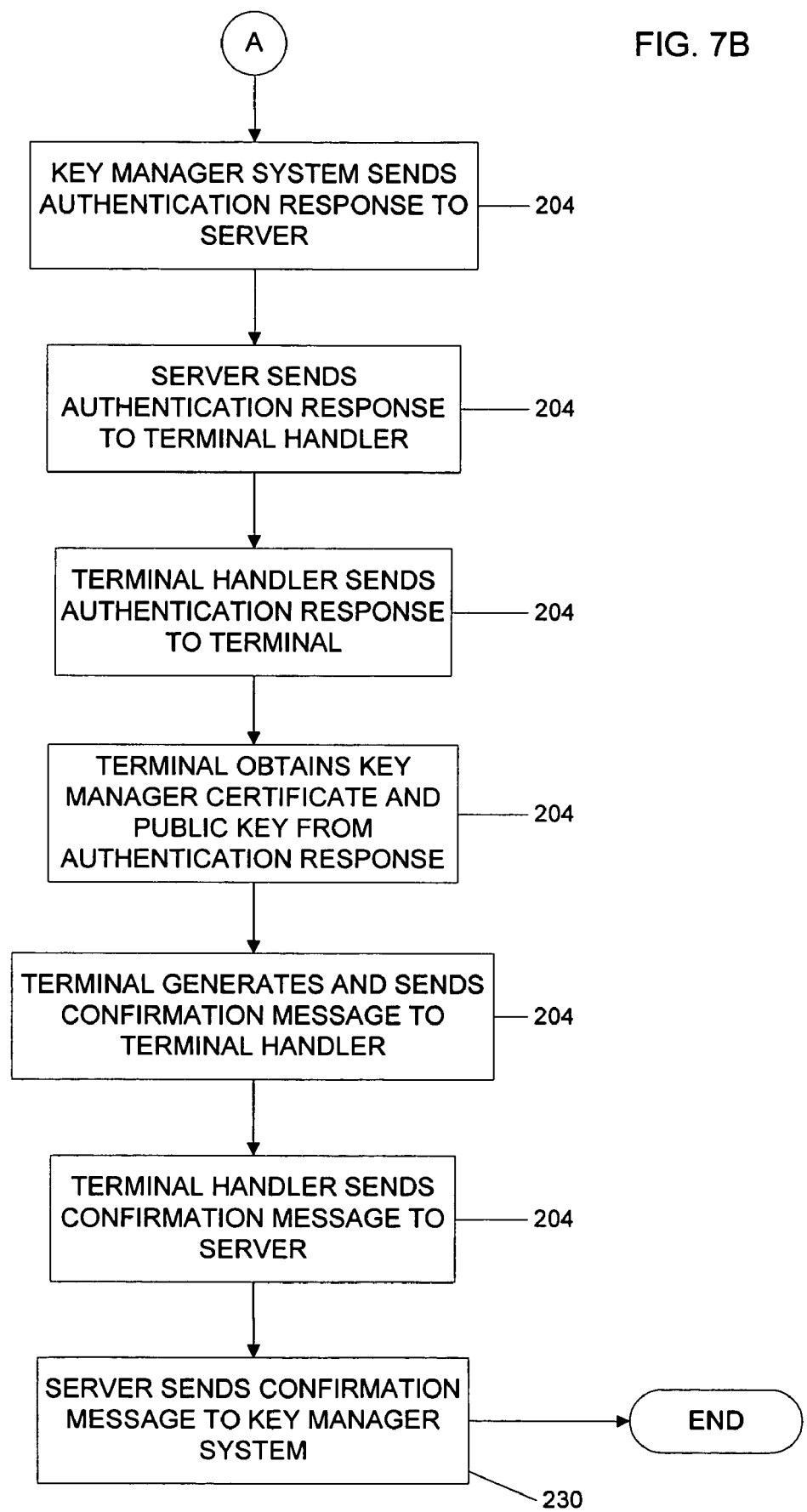

FIGS. 7A-7B illustrate a process of authenticating a terminal 12 with the key manager system 24 according to another embodiment of the invention. The authentication process shown in FIGS. 7A-7B can use the cryptographic information described with respect to FIG. 4.

As shown in FIG. 7A, the terminal 12 can initiate a key loading dialog with the terminal handler 14 (step 200). In some embodiments, the terminal 12 is configured to determine when a key is needed, such as at power-up or boot-up. In other embodiments, an analyst or operator of the terminal manager system can use a system monitor console to initiate a key loading dialog with the terminal handler 14 associated with the terminal 12.

After the terminal 12 (or an analyst or operator of the terminal manager system 13) initiates a key loading dialog, the terminal handler 14 can request the first certificate from the terminal 12 (step 202). The terminal 12 can send the first certificate to the terminal handler 14 (step 204). After obtaining the first certificate, the terminal handler 14 can request the second certificate from the terminal 12 (step 206). The terminal 12 can send the second certificate to the terminal handler 14 (step 208).

After the terminal handler 14 obtains the first certificate and the second certificate, the terminal handler 14 can create an authentication request (step 210). The authentication request can include the first certificate and the second certificate. The authentication request can also include a terminal identifier. The terminal handler 14 can send the authentication request to the server 22 (step 212), and the server 22 can send the authentication request to the key manager system 24 (step 214).

After the key manager system 24 obtains the authentication request, the key manager system can use the authority certificate, which was previously provided by the authority system (FIG. 4), to decrypt the first certificate and the second certificate (i.e., the authority public key and the terminal public key) and obtain the terminal public key and the authority public key (step 216). In some embodiments, the key manager system 24 can verify the second certificate and obtain the authority public key with a certificate verifier, such as the certificate provider that signed created and signed the second certificate. The key manager system 24 can generate an authentication request (step 217) and can send the authentication response to the server 22 (step 218). The authentication response can include the signed key manager certificate, which was previously provided by the authority system 40 (FIG. 4). The authentication response can also include a terminal identifier.

The server 22 can send the authentication response to the terminal handler 14 (step 220), and the terminal handler 14 can send the authentication response to the terminal 12 (step 222). The server 22 can use the terminal identifier included in the authentication response to determine a particular terminal handler to send the authentication response to. In some embodiments, the terminal handler 14 can use the terminal identifier to determine a particular terminal to send the authentication response to.

When the terminal 12 obtains the authentication response, the terminal handler 12 can use the second certificate, which was previously provided from the authority system 40 and includes the authority public key (FIG. 4), to decrypt the signed key manager certificate in order to obtain the key manager certificate and the key manager public key (step 224). In some embodiments, the terminal 12 can verify the key manager certificate and obtain the key manager public key with a certificate verifier, such as the certificate provider that created and signed the key manager certificate. After the terminal 12 obtains the key manager public key, the terminal 12 can generate and send a confirmation message to the terminal handler 14 (step 226). The terminal handler 14 can send the confirmation message to the server 22 (step 228), and the server 22 can send the confirmation message to the key manager system 24 (step 230).

After the terminal 12 obtains the key manager public key, the terminal 12 and the key manager system 24 each possess each other's public key.

Figure 7C:
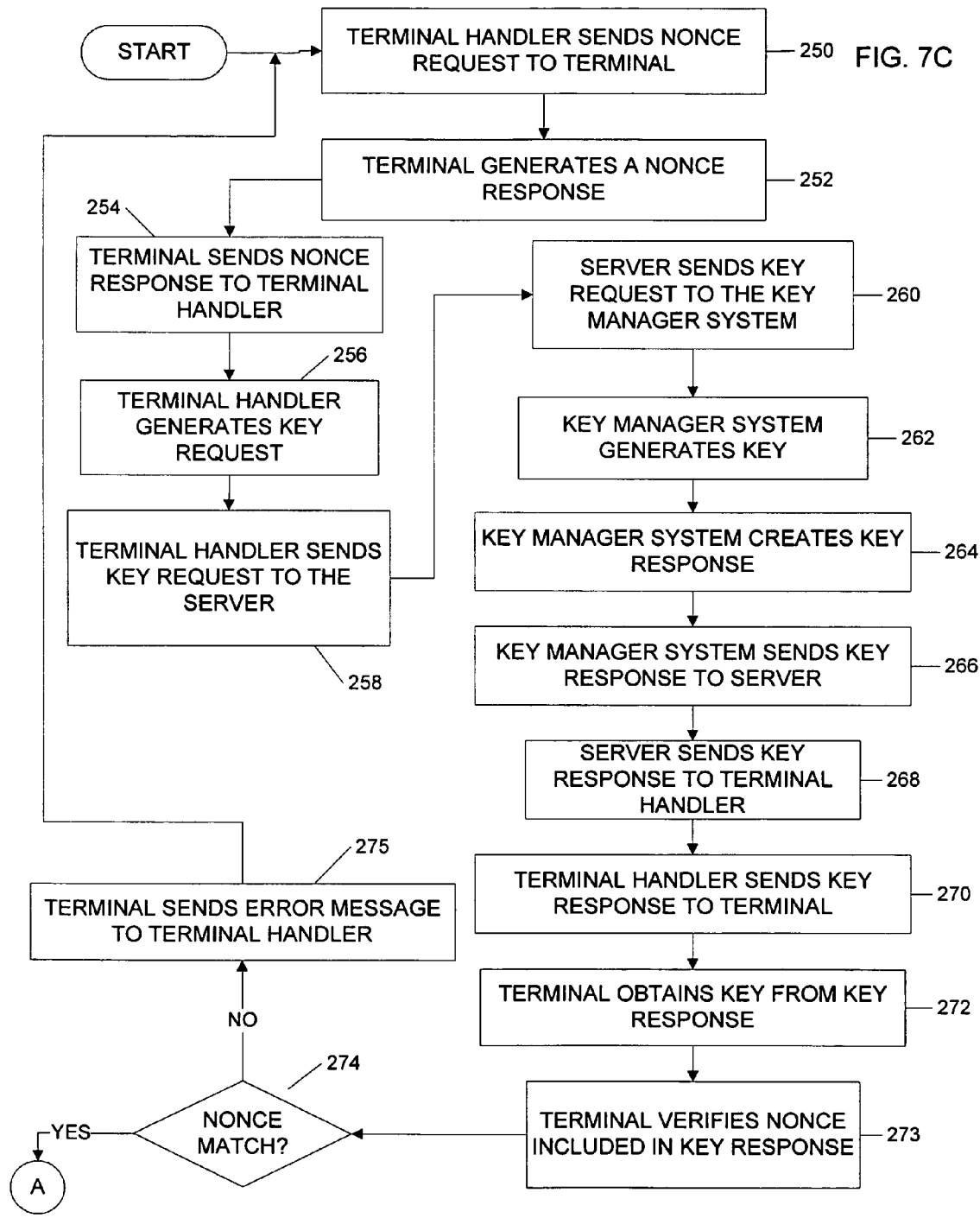

FIGS. 7C-7D illustrates a process of loading a key to the terminal 12 after the terminal 12 and the key manager system 24 have exchanged public keys as described with respect to FIGS. 7A-7B. As shown in FIG. 7C, the terminal handler 14 can send a nonce request to the terminal 12 (step 250). A nonce is a randomly chosen value, different from previously-chosen values that can be inserted into a message in order to detect replay attack. A replay attack occurs when a message is intercepted by an eavesdropper and the eavesdropper replays the message. In some embodiments, even if the eavesdropper cannot decrypt or understand the intercepted message, the eavesdropper can use the intercepted message to illegally obtain a key or cause other security problems.

The terminal 12 can generate a nonce response (step 252) and can send the nonce response to the terminal handler 14 (step 254). The nonce response can include the generated nonce. After the terminal handler 14 obtains the nonce response from the terminal 12, the terminal handler 14 can generate a key request (step 256). The key request can include the nonce. The key request can also include a terminal identifier. The terminal handler 14 can send the key request to the server 22 (step 258). The server 22 can send the key request to the key manager system 24 (step 260).

After the key manager system 24 obtains the key request, the key manager system 24 can generate a key for the terminal 12 (step 262). In some embodiments, the key can include a 3DES key. After generating the key, the key manager system 24 can create a key response (step 264). The key response can include a key certificate that includes the generated key and the nonce. The key manager system 24 can sign the key certificate with the terminal public key, which was exchanged during the authentication process described with respect to FIG. 7A. The key response can also include a terminal identifier. The key manager system 24 can send the key response to the server 22 (step 266). The server 22 can send the key response to the terminal handler 14 (step 268). The server 22 can use the terminal identifier included in the key response to determine a particular terminal handler to send the key response to. The terminal handler 14 can send the key response to the terminal 12 (step 270). In some embodiments, the terminal handler 14 can use the terminal identifier included in the key response to determine a particular terminal to send the key response to.

After receiving the key response, the terminal 12 can decrypt the key certificate and obtain the key (step 272). The terminal 12 can also decrypt the key certificate in order to obtain the nonce. The terminal 12 can verify that the nonce included in the key certificate matches the nonce that the terminal 12 provided to the terminal handler 14 (step 273). If the nonce does not match the nonce that the terminal 12 provided to the terminal handler 14 (step 274), the terminal 12 can generate and send an error message to the terminal 12 (step 275). In some embodiments, the terminal handler 14 can send the error message to the server 22, and the server 22 can send the error message to the key manager system 24. The terminal handler 14 can also send a new nonce request to the terminal 12 and can restart the key loading process (step 250).

Otherwise, if the nonce included in the key certificate matches the nonce the terminal 12 provided to the terminal handler 14, the terminal 12 can generate a key verification message (step 280). In some embodiments, the key verification message can include the nonce included in the key certificate signed with the terminal private key. The key verification message can also include a terminal identifier. The terminal 12 can send the key verification message to the terminal handler 14 (step 282), and the terminal handler 14 can send the key verification message to the server 22 (step 284).

The server 22 can send the key verification message to the key manager system 24 (step 286). In some embodiments, after receiving the key verification message, the key manager system 24 can verify the key verification message (step 288). For example, the key manager system 24 can verify the key verification message by decrypting the nonce signed with the terminal private key using the terminal public key. In some embodiments, if the key manger system 24 verifies the key verification message (i.e., the signed none decrypted with the terminal public key matches the terminal public key) (step 290), the key manager system 24 can generate a confirmation message (step 292). The confirmation message can include a terminal identifier. The key manager system 24 can send the confirmation message to the server 22 (step 294), and the server 22 can send the confirmation message to the terminal handler 14 (step 296). The server 22 can use the terminal identifier included in the confirmation message to determine a particular terminal handler 14 to send the confirmation message to. In some embodiments, the terminal handler 14 can send the confirmation message to the terminal 12 (step 298). In some embodiments, the terminal handler 14 can use the terminal identifier included in the confirmation message to determine a particular terminal to send the confirmation message to.

Otherwise, if the key manager system 24 does not verify the key verification message (step 290), the key manger system 24 can generate an error message (step 300). The error message can include a terminal identifier. The key manager system 24 can send the error message to the server 22 (step 302), and the server 22 can send the error message to the terminal handler 14 (step 304). The server 22 can use the terminal identifier included in the error message to determine a particular terminal handler to send the error message to. In some embodiments, the terminal handler 14 can send the error message to the terminal 12. The terminal handler 14 can also send a new nonce request to the terminal 12 and can restart the key loading process.

After obtaining the key from the key certification, the terminal 12 can store the key to the memory module 36 of the pin-pad 30 and can use the key to encrypt information entered in the pin-pad 30.

In some embodiments, the key manager system 24 can send a copy of the key to the terminal manager system 13 and/or another system, such as a financial institution system, so that the terminal manager system 13 and/or another system can decrypt information sent from the terminal 12. The terminal manager system 13 can store the key. For example, the terminal manager system 13 can stored the key to the key file included in the environmental database 21 and/or to the key database 52. In some embodiments, the key manager system 24 can encrypt the generated key before providing the key to the terminal manager system 13. For example, the key manager system 24 can encrypt the key with a terminal manager public key, and the terminal manager system 24 can decrypt the encrypted key with a corresponding terminal manager private key. Rather than providing the key to the terminal manager system 13, the terminal manager system 13 can request the key and/or decryption and/or encryption with the key when needed.

Various features and advantages of the invention are set forth in the following claims.

The invention claimed is:

1. A terminal manager system for managing communications between a terminal and a key manager system, the terminal having an authority private key from an authority system, the key manager system having the authority public key from the authority system, one of the authority public key and the authority private key encrypting information and the other of the authority public key and the authority private key decrypting the information, the terminal manager system comprising:

a terminal handler that receives, from the terminal, terminal information and a terminal public key encrypted with the authority private key, generates an authentication request including at least a portion of the terminal information and the terminal public key encrypted with the authority private key, and generates a key request including at least a portion of the terminal information; and a server that sends the authentication request to the key manager system, sends the key request to the key manager system, receives from the key manager system an authentication response including terminal information and a key manager public key encrypted with the authority public key, and receives from the key manager system a key response including at least a portion of the terminal information and a key generated by the key manager system and encrypted by the key manager system with the terminal public key.

2. The system of claim 1 wherein the terminal handler receives the terminal information in a plurality of messages.

3. The system of claim 1 wherein the terminal handler sends the authentication request to the server.

4. The system of claim 1 wherein the terminal handler sends the key request to the server.

5. The system of claim 1 wherein the terminal handler verifies a key entry mode of the terminal.

6. The system of claim 5 wherein the terminal handler generates a change key entry mode message and sends the change key entry mode message to the terminal.

7. The system of claim 1 wherein the key manager system generates an authentication response including at least a portion of the terminal information and the key manager public key encrypted with the authority public key, sends the authentication response to the server, and sends the key response to the server.

8. The system of claim 7 wherein the server sends the authentication response to the terminal handler.

9. The system of claim 8 wherein the server uses a terminal identifier included in the authentication response to determine how to send the authentication response to the terminal handler.

10. The system of claim 7 wherein the server sends the key response to the terminal handler.

11. The system of claim 10 wherein the server uses a terminal identifier included in the key response to determine how to send the key response to the terminal handler.

12. The system of claim 1 wherein the server formats the authentication request before sending the authentication request to the key manager system.

13. The system of claim 12 wherein the server formats the authentication request into an extensible markup language formatted request.

14. The system of claim 1 wherein the server formats the key request before sending the key request to the key manager system.

15. The system of claim 14 wherein the server formats the key request into an extensible markup language formatted request.

16. The system of claim 1 wherein the terminal initiates a key loading message dialog with the terminal handler.

17. The system of claim 1 wherein the terminal manager system allows an operator to initiate a key loading message dialog with the terminal handler.

18. The system of claim 1 wherein the terminal manager system executes an extraction program to create a terminal table and provides a key manager system access to the terminal table, the terminal table including information about a plurality of terminals managed with the terminal manager system.

19. A method of loading a key to a terminal from a key manager system, the terminal having an authority private key, the key manager system having the authority public key, the method comprising:

sending terminal information and a terminal public key encrypted with the authority private key from the terminal to a terminal handler;

generating an authentication request with the terminal handler, the authentication request including at least a portion of the terminal information and including the terminal public key encrypted with the authority private key;

sending the authentication request to a server and to the key manager system;

at the key manager system, decrypting, with the authority public key, the terminal public key encrypted with the authority private key;

generating an authentication response with the key manager system, the authentication response including a key manager public key encrypted with the authority public key;

sending the authentication response to the terminal handler and to the terminal;

at the terminal, decrypting, with the authority private key, the key manager public key encrypted with the authority public key:

generating a key request with the terminal handler;

sending the key request to the server and to the key manager system;

generating, with the key manager system, a generated key and a key response, the key response including the generated key encrypted with the terminal public key;

sending the key response to the terminal handler and to the terminal; and at the terminal, decrypting, with the terminal private key, the generated key encrypted with the terminal public key to obtain the generated key.

20. The method of claim 19 further comprising sending the authentication response to the server.

21. The method of claim 20 further comprising determining with the server how to send the authentication response to the terminal handler using a terminal identifier included in the authentication response.

22. The method of claim 19 further comprising sending the key response to the server.

23. The method of claim 22 further comprising determining with the server how to send the key response to the terminal handler using a terminal identifier included in the key response.

24. The method of claim 19 wherein sending terminal information to a terminal handler includes sending terminal information in a plurality of messages.

25. The method of claim 19 further comprising verifying a key entry mode of the terminal with the terminal handler.

26. The method of claim 25 further comprising generating a change key entry mode message with the terminal handler and sending the change key entry mode message to the terminal.

27. The method of claim 19 further comprising determining how to send the authentication response to the terminal handler using a terminal identifier included in the authentication response.

28. The method of claim 19 further comprising determining how to send the key response to the terminal handler using a terminal identifier included in the key response.

29. The method of claim 19 further comprising formatting the authentication request with the server before sending the authentication request to the key manager system.

30. The method of claim 29 wherein formatting the authentication request includes formatting the authentication request into an extensible markup language formatted request.

31. The method of claim 19 further comprising formatting the key request with the server before sending the key request to the key manager system.

32. The method of claim 31 wherein formatting the key request includes formatting the key request into an extensible markup language formatted request.

33. The method of claim 19 further comprising initiating a key loading message dialog with the terminal handler.

34. The method of claim 33 wherein initiating a key loading message dialog with the terminal handler includes sending a key loading message dialog to the terminal handler from the terminal.

35. The method of claim 33 wherein initiating a key loading message dialog with the terminal handler includes sending a key loading message dialog to the terminal handler from a console.

36. The method of claim 19 further comprising executing an extraction program configured to create a terminal table and providing the key manager system access to the terminal table, the terminal table including information about a plurality of terminals managed with a terminal manager system.

37. A method of exchanging cryptographic information used for loading keys from a key manager system to a plurality of terminals included in a financial transaction system, the key manager system having a key pair including a key manager public key and a corresponding key manager private key, wherein one of the key manager public key and the key manager private key encrypts information and the other of the key manager public key and the key manager private key decrypts the information, the method comprising:

at the key manager system, encrypting the key manager public key with the key manager private key;

sending the key manager public key encrypted with the key manager private key and the key manager public key to an authority system;

at the authority system, decrypting, with the key manager public key, the key manager public key encrypted with the key manager private key;

verifying, at the authority system, the key manager public key encrypted with the key manager private key;

at the authority system, encrypting, with the authority private key, the authority public key;

sending the authority public key encrypted with the authority private key and the authority public key to at least one of a terminal manager system and the key manager system; and verifying, at the at least one of the terminal manager system and the key manager system, the authority public key encrypted with the authority private key.

38. The method of claim 37 further comprising generating a hash, the hash including a hash of at least one of the key manager public key encrypted with the key manager private key and the key manager public key, with the key manager system and sending the hash to the authority system.

39. The method of claim 37 further comprising storing the key manager public key encrypted with the key manager private key to a key database.

40. The method of claim 37 further comprising sending a first hash to the terminal manager system, the first hash including a hash of at least one of the authority public key encrypted with the authority private key and the authority public key.

41. The method of claim 40 further comprising requesting a second hash.

42. The method of claim 41 further comprising generating the second hash of at least one of the authority public key encrypted with the authority private key and the authority public key with the key manager system and sending the second hash to the terminal manager system.

43. The method of claim 42 further comprising comparing the first hash and the second hash.

44. The method of claim 37 further comprising storing the authority public key to a key database.

45. The method of claim 37 further comprising sending a key manager public key encrypted with an authority private key to the terminal manager system.

46. The method of claim 45 further comprising storing the key manager public key encrypted with the authority private key to a key database.

47. The method of claim 37 wherein verifying the authority public key encrypted with the authority private key includes
at the at least one of the terminal manager system and the key manager system, decrypting, with the authority public key, the authority public key encrypted with the authority private key; and
comparing the authority public key to the authority public key encrypted with the authority private key decrypted with the authority public key.

48. The method of claim 45 wherein verifying the key manager public key encrypted with the authority private key includes comparing the key manager public key to the key manager public key encrypted with the authority private key decrypted with the authority public key.

49. The system of claim 1 wherein the terminal handler sends the authentication response to the terminal, the terminal receiving the authentication response, decrypting, with the authority private key, the authentication response to authenticate the key manager system and to obtain the key manager public key, and wherein the terminal handler sends the key response to the terminal, the terminal receiving the key response, decrypting, with the terminal private key, the key response to obtain the generated key.

50. The system of claim 1 wherein the key manager receives the authentication request and decrypts, with the authority public key, the authentication request to authenticate the terminal and to obtain the terminal public key.

51. The method of claim 19 wherein decrypting, with the authority public key, the terminal public key encrypted with the authority private key further includes authenticating the terminal.

52. The method of claim 19 wherein decrypting, with the authority public key, the terminal public key encrypted with the authority private key further includes obtaining the terminal public key at the key manager system.

53. The method of claim 19 wherein decrypting, with the authority private key, the key manager public key encrypted with the authority public key further includes authenticating the key manager system.

54. The method of claim 19 wherein decrypting, with the authority private key, the key manager public key encrypted with the authority public key further includes obtaining the key manager public key at the terminal.

* * * * *

UNITED STATES PATENT AND TRADEMARK OFFICE
CERTIFICATE OF CORRECTION

PATENT NO. : 7,627,125 B2  Page 1 of 1
APPLICATION NO. : 11/165429
DATED : December 1, 2009
INVENTOR(S) : Lumsden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Second Day of November, 2010

David J. Kappos
*Director of the United States Patent and Trademark Office*